US006397695B1

(12) United States Patent
Okada et al.

(10) Patent No.: US 6,397,695 B1
(45) Date of Patent: Jun. 4, 2002

(54) CONTROL APPARATUS FOR HYDRAULICALLY-OPERATED VEHICULAR TRANSMISSION

(75) Inventors: Kazuo Okada; Shouji Asatsuke, both of Tochigi-ken (JP); Hiromitsu Ishibashi, Columbus, OH (US); Shoichi Tanizawa, Tochigi-ken (JP); Shinichi Nishio, Tochigi-ken (JP); Tetsuya Mochizuki, Tochigi-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/567,429

(22) Filed: May 10, 2000

(30) Foreign Application Priority Data

May 12, 1999 (JP) ........................................... 11-131685
Sep. 9, 1999 (JP) ........................................... 11-256002

(51) Int. Cl.[7] ................................................ F16H 61/04
(52) U.S. Cl. .......................... 74/335; 477/150; 477/155
(58) Field of Search .............................. 74/335, 336 R, 74/337; 477/150, 152, 154, 155; 192/3.54, 3.58

(56) References Cited

U.S. PATENT DOCUMENTS 5,205,192 A * 4/1993 Ohashi et al. ................ 74/867
5,293,790 A * 3/1994 Ohashi et al. ................ 74/869
5,960,669 A * 10/1999 Ohashi et al. ................ 74/335
6,055,879 A * 5/2000 Abe et al. ..................... 74/335

FOREIGN PATENT DOCUMENTS

JP 9-229179 9/1997

* cited by examiner

*Primary Examiner*—Sherry Estremsky
(74) *Attorney, Agent, or Firm*—Armstrong, Westerman & Hattori, LLP

(57) ABSTRACT

Shift valves $\mathbf{14}_1$, $\mathbf{14}_2$, $\mathbf{14}_3$ are provided to switch oil passage connections to a state in which an oil pressure in one hydraulic clutch of an arbitrary speed transmission train and an oil pressure in a hydraulic clutch of a transmission train which is adjacent thereto as seen in the order of speed are controllable by a pair of linear solenoid valves $\mathbf{20}_1$, $\mathbf{20}_2$. Skipped speed change from a predetermined first speed transmission train to a second speed transmission train which is not adjacent to the first speed transmission train is made possible. In concrete, a large-capacity accumulator A5 is connected to an oil passage L19 which is in communication with 5th-speed hydraulic clutch C5. At the time of skipped speed changing from 5th speed to 3rd speed, shift valves $\mathbf{14}_1$, $\mathbf{14}_2$, $\mathbf{14}_3$ are switched to a state of 3rd–4th speed change. The oil pressures in the hydraulic clutches C3, C4 for 3rd and 4th speed transmission trains, respectively, are made controllable by the linear solenoid valves $\mathbf{20}_1$, $\mathbf{20}_2$. While buffering the pressure decrease of the oil pressure in the 5th-speed hydraulic clutch C5 by the accumulator $A_5$, pressure increase control of 3rd-speed clutch C3 is carried out by one of the linear solenoid valves to thereby skip-downshift from 5th to 3rd speed. The other linear solenoid valve is held at a low-pressure waiting state to prepare itself for the 3rd–4th speed switch-upshifting.

8 Claims, 8 Drawing Sheets

A1
A1a
A2
A3
A5
A5a
A4H
C1
C2
C3
C4
C5
CH
L1
L2
L3
L3a
L3b
L4
L5
L6
L7
L8
L9
L10
L11
L12
L13
L14
L15
L16
L17
L18
L19
L20
L21
L23
L26
L27
L28
L29
L30
L31
LD
LDa
LDb
11
11a
12
13
16
16a
16b
16c
17
18
18a
19
22
22a
24
25
25a
6a

THROTTLE OPENING
FULLY OPEN
FULLY CLOSED
VEHICLE SPEED
1→2
1←2
2→3
2←3
3→4
3←4
4→5
4←5
A
B
C

FIG.4

| | 1ST SPEED | 2ND SPEED | 2ND⇔3RD SPEED | 3RD SPEED | 3RD⇔4TH SPEED | 4TH SPEED | 4TH⇔5TH SPEED | 5TH SPEED |
|---|---|---|---|---|---|---|---|---|
| 1ST-SOLENOID VALVE $21_1$ | ○ | × | × | ○ | ○ | × | × | ○ |
| 2ND-SOLENOID VALVE $21_2$ | ○ | ○ | × | × | × | × | ○ | ○ |
| 3RD-SOLENOID VALVE $21_3$ | ○ | ○ | ○ | ○ | × | × | × | × |
| 1ST-SHIFT VALVE $14_1$ | RIGHT | LEFT | LEFT | RIGHT | RIGHT | LEFT | LEFT | RIGHT |
| 2ND-SHIFT VALVE $14_2$ | RIGHT | RIGHT | LEFT | LEFT | LEFT | LEFT | RIGHT | RIGHT |
| 3RD-SHIFT VALVE $14_3$ | RIGHT | RIGHT | RIGHT | RIGHT | LEFT | LEFT | LEFT | LEFT |
| 1ST-LINEAR SOLENOID VALVE $20_1$ | 2ND-SPEED PRESSURE | — | 2ND-SPEED PRESSURE | — | 4TH-SPEED PRESSURE | — | 4TH-SPEED PRESSURE | — |
| 2ND-LINEAR SOLENOID VALVE $20_2$ | (1ST-SPEED HOLDING PRESSURE) | — | 3RD-SPEED PRESSURE | — | 3RD-SPEED PRESSURE | — | 5TH-SPEED PRESSURE | — |

○···ENERGIZED, ×···NOT ENERGIZED

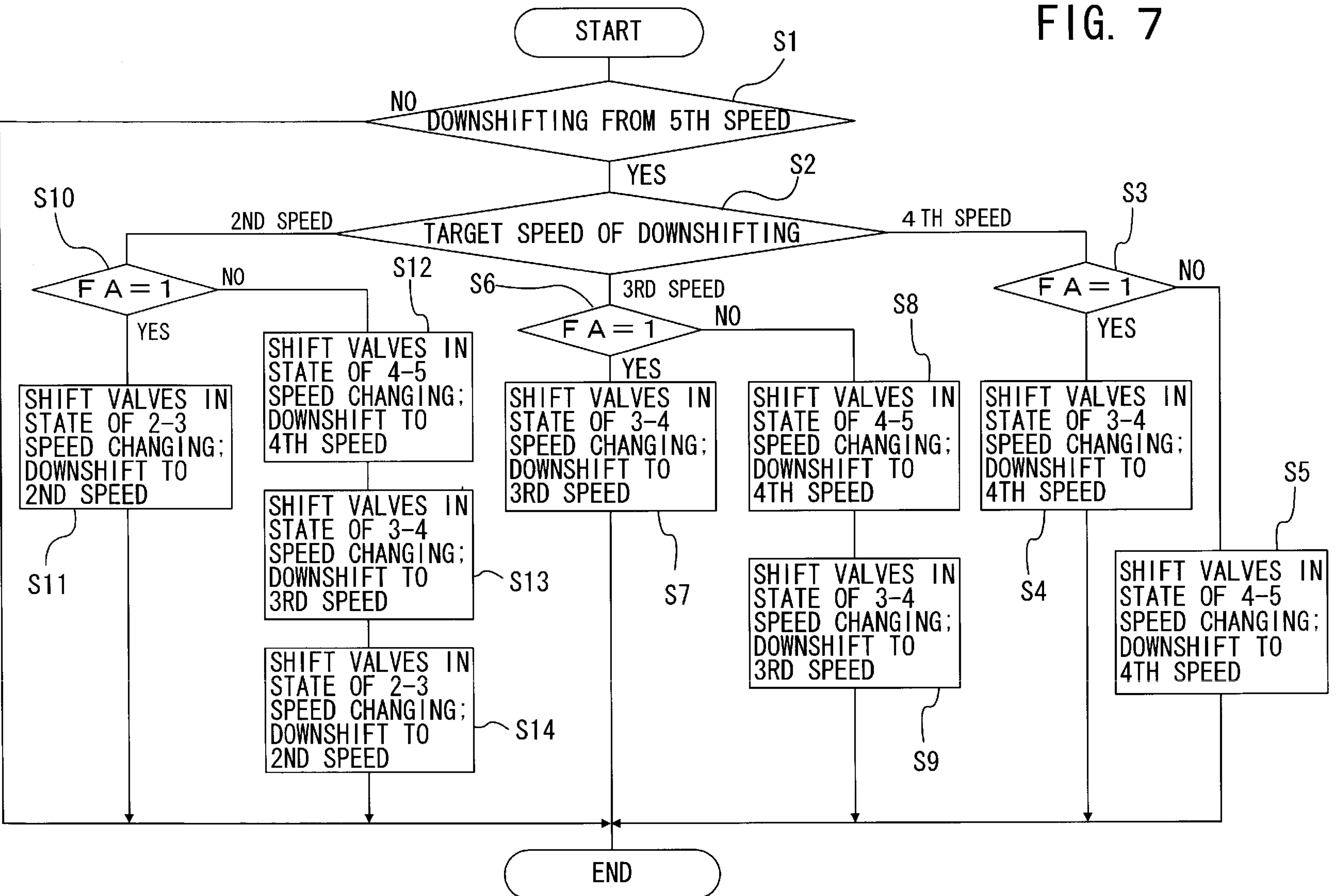
FIG. 7
START
S1
DOWNSHIFTING FROM 5TH SPEED
NO
YES
S2
TARGET SPEED OF DOWNSHIFTING
2ND SPEED
3RD SPEED
4 TH SPEED
S10
F A = 1
NO
YES
SHIFT VALVES IN STATE OF 2-3 SPEED CHANGING; DOWNSHIFT TO 2ND SPEED
S11
S12
SHIFT VALVES IN STATE OF 4-5 SPEED CHANGING; DOWNSHIFT TO 4TH SPEED
SHIFT VALVES IN STATE OF 3-4 SPEED CHANGING; DOWNSHIFT TO 3RD SPEED
S13
SHIFT VALVES IN STATE OF 2-3 SPEED CHANGING; DOWNSHIFT TO 2ND SPEED
S14
S6
F A = 1
NO
YES
SHIFT VALVES IN STATE OF 3-4 SPEED CHANGING; DOWNSHIFT TO 3RD SPEED
S7
S8
SHIFT VALVES IN STATE OF 4-5 SPEED CHANGING; DOWNSHIFT TO 4TH SPEED
SHIFT VALVES IN STATE OF 3-4 SPEED CHANGING; DOWNSHIFT TO 3RD SPEED
S9
S3
F A = 1
NO
YES
SHIFT VALVES IN STATE OF 3-4 SPEED CHANGING; DOWNSHIFT TO 4TH SPEED
S4
S5
SHIFT VALVES IN STATE OF 4-5 SPEED CHANGING; DOWNSHIFT TO 4TH SPEED
END

CONTROL APPARATUS FOR HYDRAULICALLY-OPERATED VEHICULAR TRANSMISSION

BACKGROUND OF THE INVENTION

1. Field of the Invention

The present invention relates to a control apparatus for a hydraulically-operated vehicular transmission having a plurality of hydraulic engaging elements for selectively establishing a plurality of speed transmission trains (or speed stages). In this invention, the term "vehicular transmission" means a transmission for use in a vehicle such as a motor vehicle.

2. Description of the Related Art

As this kind of control apparatus, there is known the following in Japanese Published Unexamined Patent Application No. 229179/1997. Namely, the control apparatus comprises a pair of linear solenoid valves, and switching means for switching oil passage connections into a state in which an oil pressure in a hydraulic engaging element for an arbitrary speed transmission train and an oil pressure in a hydraulic engaging element for a speed transmission train which is adjacent, as seen in an order of speed, to the arbitrary speed transmission train are controllable by the pair of linear solenoid valves. The switching means is controlled, at the time of speed changing, such that an oil pressure in an off-going hydraulic engaging element for a speed transmission train so far established and an oil pressure in an on-coming hydraulic engaging element for a speed transmission train to be established next which is adjacent, as seen in the order of speed, to the speed transmission train so far established become controllable by the pair of linear solenoid valves. (Note: The "off-going" hydraulic engaging element is a hydraulic clutch which has so far been engaged but which is to be disengaged from now on and the "on-coming" hydraulic engaging element means a hydraulic clutch which is going to be engaged from now on.) In addition, the pair of linear solenoid valves are controlled such that the oil pressure in the off-going hydraulic engaging element is lowered by one of the pair of linear solenoid valves, said one linear solenoid valve handling the off-going hydraulic engaging element, and that the oil pressure in the on-coming hydraulic engaging element is increased by the other of the pair of linear solenoid valves, said the other linear solenoid valve handling the on-coming hydraulic engaging element.

In the above-described conventional apparatus, the oil pressure in each of the on-coming and the off-going hydraulic engaging elements can be directly controlled by each of the linear solenoid valves. It is therefore advantageous in buffering or reducing a speed change shock.

In this conventional apparatus, however, it is only the two hydraulic engaging elements adjacent or next to each other as seen in the order of speed that can be controlled by the pair of linear solenoid valves. Therefore, in case a skipped speed change command (i.e., a command to change the transmission train by skipping one or more transmission trains), e.g., a command of downshifting from the 5th-speed transmission train to the 3rd-speed transmission train is issued, it is impossible to simultaneously control the oil pressures in the hydraulic engaging element for the 5th-speed transmission train and the oil pressure in the hydraulic engaging element for the 3rd-speed transmission train. As a solution, it is necessary, first, to control the oil pressures in the hydraulic engaging element for the 5th speed and in the hydraulic engaging element for the 4th-speed by the pair of linear solenoid valves to thereby downshift from the 5th-speed transmission train to the 4th-speed transmission train. It is, thereafter, necessary to control the oil pressures in the hydraulic engaging element for the 4th speed and in the hydraulic engaging element for the 3rd speed by the pair of linear solenoid valves to thereby downshift from the 4th-speed transmission train to the 3rd-speed transmission train. In this manner, it is possible with this conventional apparatus to perform the speed changing (or speed shifting) only one speed transmission train (or one speed stage) at a time. As a result, the speed change response to the skipped speed change command becomes poor.

In view of the above-described disadvantages, the present invention has an object of providing a control apparatus for a hydraulically-operated vehicular transmission in which the skipped speed changing can be smoothly performed with a good response.

SUMMARY OF THE INVENTION

In order to attain the above and other objects, the present invention is a control apparatus for a hydraulically-operated vehicular transmission having a plurality of hydraulic engaging elements for selectively estabilishing a plurality of speed transmission trains, said apparatus comprising: a pair of linear solenoid valves; switching means for switching oil passage connections into a state in which an oil pressure in a hydraulic engaging element for an arbitrary speed transmission train and an oil pressure in a hydraulic engaging element for a speed transmission train which is adjacent, as seen in an order of speed, to the arbitrary speed transmission train are controllable by the pair of linear solenoid valves; first control means for speed changing which controls the switching means at a time of speed changing such that an oil pressure in an off-going hydraulic engaging element for a speed transmission train so far established and an oil pressure in an on-coming hydraulic engaging element for a speed transmission train to be established next which is adjacent, as seen in the order of speed, to the speed transmission train so far established, become controllable by the pair of linear solenoid valves, the first control means also controlling the pair of linear solenoid valves such that the oil pressure in the off-going hydraulic engaging element is lowered by one of the pair of linear solenoid valves, said one linear solenoid valve handling the off-going hydraulic engaging element, and that the oil pressure in the on-coming hydraulic engaging element is increased by the other of the pair of linear solenoid valves, said the other linear solenoid valve handling the on-coming hydraulic engaging element; an accumulator connected to an oil passage which is in communication with a predetermined first speed transmission train; and second control means for speed changing which controls the switching means, at a time of speed changing from the first speed transmission train to a second speed transmission train which is not adjacent to the first speed transmission train as seen in the order of speed, such a) that the oil passage which is in communication with a hydraulic engaging element for the first speed transmission train is connected to an oil discharge passage, and b) that an oil pressure in a hydraulic engaging element for the second speed transmission train and an oil pressure in a hydraulic engaging element for a third speed transmission train which is adjacent to the second speed transmission train on a side near the first speed transmission train, as seen in the order of speed, are controllable by the pair of linear solenoid valves, the second control means also controlling the pair of liner solenoid valves such c) that the oil pressure in the hydraulic engaging element for the second speed transmission train is increased by one of the pair of liner solenoid valves, said one linear solenoid valve handling the hydraulic engaging element for the second speed transmission train, and d) that the oil pressure in the hydraulic engaging element for the third speed transmission train is kept to a state before the pressure increasing by the other of the pair of liner solenoid valves, said the other linear solenoid valve handling the hydraulic engaging element for the third speed transmission train. (Note: In this specification, “1st”, “2nd”, etc. as in “1st-speed transmission train”, etc. are used in a true sense of numerical order, i.e., in the meaning of No. 1, No. 2, etc. On the other hand, “first speed”, “second speed”, etc. as in “a first speed transmission train”, etc. are used not in the true numerical order but in the sense as explained herein.)

According to the present invention, when a skipped speed change command is issued to change the speed from the first speed transmission train (5th speed transmission train in the embodiment to be described in more detail hereinafter) to the second speed transmission train (3rd speed transmission train or 2nd speed transmission train in the embodiment), the connections of the oil passages are switched to the state in which the oil pressure in the hydraulic engaging element for the second speed transmission train and the oil pressure in the hydraulic engaging element for the third speed transmission train (4th speed transmission train or 3rd speed transmission train in the embodiment) are controllable by the pair of linear solenoid valves. In this state, although the oil pressure in the hydraulic engaging element for the first speed transmission train can no longer be controlled by the linear solenoid valves, a sudden pressure decrease in the hydraulic engaging element for the first speed transmission train can be buffered by the accumulator. In conjunction with the pressure increase control of the oil pressure in the hydraulic engaging element for the second speed transmission train by one of the linear solenoid valves, the skipped speed changing can be provided at a good response without giving rise to large shocks.

Further, in the course of skipped speed changing from the first speed transmission train to the second speed transmission train, a speed change command from the second speed transmission train to the third speed transmission train will sometimes be issued due to a change in the depressed state of an accelerator pedal or the like. According to the present invention, during the skipped speed changing from the first speed transmission train to the second speed transmission train, the other of the pair of linear solenoid valves is kept ready for the increasing in the oil pressure in the hydraulic engaging element for the third speed transmission train. Therefore, when the speed change command to the third speed transmission train has been issued, the oil pressure in the hydraulic engaging element for the third speed transmission train can be quickly increased, and the speed changing to the third speed transmission train can thus be performed with a good response, resulting in a driver's improved feeling at driving (or drivability).

At the time of speed changing from the first speed transmission train to a fourth speed transmission train (4th speed transmission train in the embodiment) which is adjacent to the first speed transmission train as seen in the order of speed, it is also possible to perform the following controls: namely, the connections of the oil passages are switched to the state in which the oil pressure in the hydraulic engaging element for the first speed transmission train and the oil pressure in the hydraulic engaging element for the fourth speed transmission train are controllable by both the linear solenoid valves; and the pressure decrease control of the oil pressure in the hydraulic engaging element for the first speed transmission train is performed by one of the linear solenoid valves, and the pressure increase control of the oil pressure in the hydraulic engaging element for the fourth speed transmission train is performed by the other of the linear solenoid valves, namely, the control by the above-described first control means for speed changing is performed. However, the pressure decrease characteristics of the hydraulic engaging element for the first speed transmission train will be subject to an effect by the accumulator. Therefore, the accumulator will be a possible cause for external perturbations in the pressure decrease control by the linear solenoid valves, thereby resulting in a speed change shock and a poor speed change response.

It is therefore preferable to provide the control apparatus with third control means for speed changing which controls the switching means, at a time of speed changing from the first speed transmission train to a fourth speed transmission train which is adjacent to the first speed transmission train, as seen in the order of speed, such e) that the oil passage which is in communication with the hydraulic engaging element for the first speed transmission train is connected to the oil discharge passage, f) that an oil pressure in a hydraulic engaging element for the fourth speed transmission train and an oil pressure in a hydraulic engaging element for a fifth speed transmission train which is adjacent to the fourth speed transmission train on a side away from the first speed transmission train, as seen in the order of speed, are controllable by the pair of linear solenoid valves, the third control means also controlling the pair of liner solenoid valves such g) that the oil pressure in the hydraulic engaging element for the fourth speed transmission train is increased by one of the pair of linear solenoid valves, said one linear solenoid valve handling the hydraulic engaging element for the fourth speed transmission train, and h) that the oil pressure in the hydraulic engaging element for the fifth speed transmission train is kept to a state before the pressure increasing by the other of the liner solenoid valves, said the other linear solenoid valve handling the hydraulic engaging element for the fifth speed transmission train. This arrangement has the following advantages. Namely, a smooth speed changing from the first speed transmission train to the fourth speed transmission train can be performed as a result of the function of buffering, by means of the accumulator, the pressure decrease of the oil pressure in the hydraulic engaging element for the first speed transmission train and as a result of the pressure increase control, by means of said one linear solenoid valve, of the oil pressure in the hydraulic engaging element for the fourth speed transmission train. When a speed change command to the fifth speed transmission train is issued in the course of the above-described speed changing, the oil pressure in the hydraulic engaging element for the fifth speed transmission train can be rapidly increased by said the other linear solenoid valve. As a result, the speed changing to the fifth speed transmission train can be performed with a good response.

In a state in which the pressurized oil is not sufficiently accumulated in the accumulator, the decrease in the oil pressure in the hydraulic engaging element for the first speed transmission train cannot be buffered effectively. As a solution, it is preferable to provide the control apparatus with detecting means for detecting an amount of accumulated oil in the accumulator; and prohibiting means for prohibiting the control by the second control means and the control by the third control means when the amount of accumulated oil as detected by the detecting means is discriminated to be below a predetermined value. In this manner, at the time of speed changing from the first speed transmission train when sufficient pressurized oil has not been accumulated in the accumulator, the control by means of the above-described first control means for speed changing is performed. Thus, the pressure decrease of the oil pressure in the hydraulic engaging element for the first speed transmission train is controlled by means of the linear solenoid valves.

Further, in order to appropriately buffer, by the accumulator, the pressure decrease of the oil pressure in the hydraulic engaging element for the first speed transmission train without giving rise to a speed change shock, it is desirable to control, by pressure regulating means, the oil pressure to be inputted into a back pressure chamber of the accumulator (accumulator back pressure) depending on the running (or operating) conditions of the vehicle. In this case, preferably, the control apparatus further comprises a changeover valve which, when the switching means is controlled to the state in which the oil pressure in the hydraulic engaging element for the first speed transmission train is controllable by said one linear solenoid valve, disconnects a connection between the back pressure chamber of the accumulator and the pressure regulating means to thereby connect the back pressure chamber to a line-pressure oil passage which is in communication with a hydraulic oil pressure source. The oil pressure in the hydraulic engaging element for the first speed transmission train can thus be advantageously controlled in an adequate manner by said one linear solenoid valve without being adversely affected by the accumulator.

In the embodiment to be described in more derail hereinafter, what corresponds to the above-described first control means for speed changing is the processing in the steps S5, S8, S9, S12–S14 in FIG. 7. What corresponds to the above-described second control means for speed changing is the processing in steps S7 and S11 in FIG. 7. What corresponds to the above-described third control means for speed changing is the processing in the step S4 in FIG. 7. What corresponds to the above-described detecting means is the processing of setting a flag FA for discriminating the accumulated pressure shown in FIG. 8. What corresponds to the above-described prohibiting means is the processing in steps S6 and S10 in FIG. 7.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 4 is a table showing the states of energizing and de-energizing of solenoid valves at the time of establishing each speed transmission train and at the time of speed changing among each of the speed transmission trains, as well as the clutch pressure that can be controlled by linear solenoid valves;

FIG. 7 is a flow chart showing a control program at the time of downshifting from the 5th speed.

DETAILED DESCRIPTION OF A PREFERRED EMBODIMENT

Figure 1:
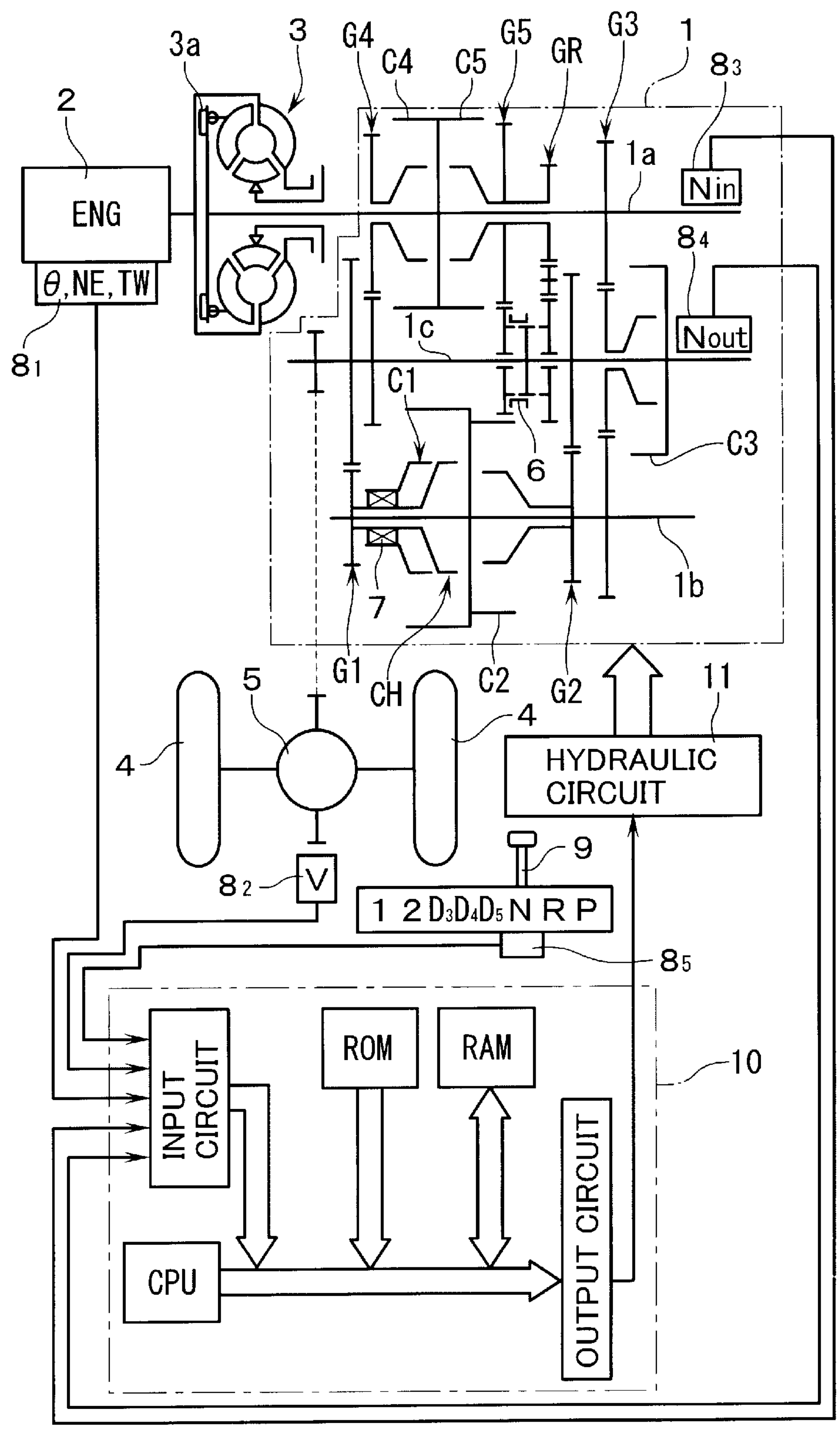
FIG. 1 is a block diagram showing a transmission and a control system to which the present invention is applied.

With reference to FIG. 1, reference numeral 1 denotes a hydraulically-operated vehicular transmission for providing speed changing of five forward transmission trains and one reverse transmission train. The transmission 1 is provided with a first input shaft 1*a* which is connected to an engine 2 through a fluid torque converter 3 which is equipped with a lock-up clutch 3*a*; a second input shaft 1*b* which rotates synchronously with the first input shaft 1*a*; and an output shaft 1*c* which is connected to driving wheels 4 of a vehicle through a differential gear 5. Between the second input shaft 1*b* and the output shaft 1*c*, there are disposed in parallel with each other a 1st speed transmission train G1 and a 2nd-speed transmission train G2 for forward running. Between the first input shaft 1*a* and the output shaft 1*c*, there are disposed in parallel with each other 3rd-speed through 5th-speed transmission trains G3, G4, G5 and a reverse transmission train GR. 1st-speed through 5th-speed hydraulic clutches C1, C2, C3, C4, C5, which are defined as hydraulic engaging elements, are respectively interposed in these forward transmission trains so that each of the forward transmission trains can be selectively established by the engagement of respective hydraulic clutches. The reverse transmission train GR and the 5th-speed transmission train G5 use the 5th-speed hydraulic clutch C5 in common with each other. The 5th-speed transmission train G5 and the reverse train GR are arranged to be selectively established by a switching operation of a selector gear 6 on the output shaft 1*c*, between the forward running side on the left side as seen in the figure and the reverse running side on the right side, respectively. The second input shaft 1*b* is connected through a gear to the gear train of the 3rd-speed transmission train on the input side of the 3rd-speed hydraulic clutch C3 which is disposed on the output shaft 1*c*. The second input shaft 1*b* rotates synchronously with the first input shaft 1*a*.

In the 1st-speed transmission train G1, a one-way clutch 7 which allows for an overrunning of the output side is interposed between the 1st-speed hydraulic clutch C1 and the gear train of the 1st-speed transmission train G1 on the output side of the 1st-speed hydraulic clutch C1. Further, a 1st-speed holding clutch CH which directly connects the output side to the gear train of the 1st-speed train G1 is built in the 1st-speed hydraulic clutch C1. In this manner, by the engagement of the 1st-speed holding clutch CH, the 1st-speed transmission train G1 can be established in a state in which the overrunning of the output side is not allowed, i.e., in a state in which the engine brake operates.

There are provided an electronic control circuit (or unit) 10 which is made up of a microcomputer which receives input signals from; an engine sensor $\mathbf{8}_1$ for detecting a throttle opening θ, rotational speed (or rotational frequency)

NE, cooling water temperature TW, or the like of the engine 2; a vehicle speed sensor $\mathbf{8}_2$ for detecting the vehicle speed V based on the rotational speed of the differential gear 5; rotational speed sensors $\mathbf{8}_3$, $\mathbf{8}_4$ for detecting the rotational speed Nin of the input shaft 1*a* and the rotational speed Nout of the output shaft 1*c*, respectively, of the transmission 1; and a position sensor $\mathbf{8}_5$ for detecting the position of a selector lever 9 disposed inside the vehicle. A hydraulic circuit 11 for the hydraulic clutches is also provided. Solenoid valves which are built in the hydraulic circuit 11 and which are described in more detail hereinafter are controlled by the electronic control unit 10 to thereby provide speed changing.

Figure 2:
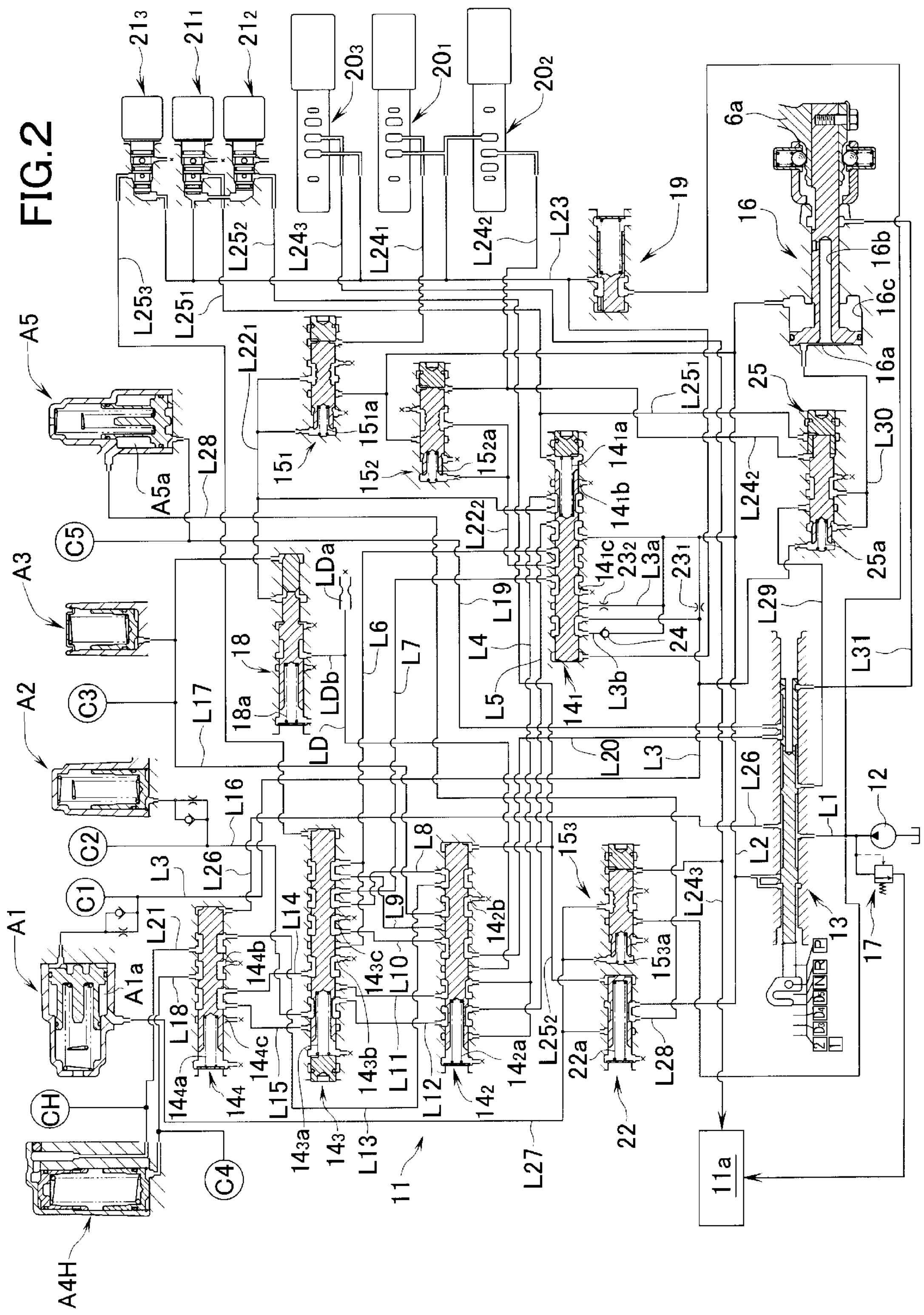
FIG. 2 is a diagram showing a hydraulic oil circuit of the transmission in FIG. 1.

In the hydraulic circuit 11, there are provided, as shown in FIG. 2, the following: i.e., a hydraulic oil pressure source 12 which is made up of a pump driven by the engine 2, a manual valve 13 which is operated in an interlocking relationship with the selector lever 9; switching means which are made up of first through fourth, i.e., a total of four, shift valves $\mathbf{14}_1$, $\mathbf{14}_2$, $\mathbf{14}_3$ $\mathbf{14}_4$; a pair of, i.e., first and second, pressure regulating valves $\mathbf{15}_1$ $\mathbf{15}_2$; and a servo valve 16 which switches between the forward running and the reverse running and which has connected thereto a shift fork 6*a* which is connected to the selector gear 6.

The manual valve 13 is switchable to a total of seven positions: i.e., "P" position which is a switchover portion when P range for parking is selected by the selector lever 9; "R" position which is a switchover position when R range for reverse running is selected; "N" position which is a switchover position when N range for a neutral state is selected; "$D_5$" position which is a switchover position when $D_5$ range for the 1st through the 5th automatic speed change ranges are selected; "$D_4$" position which is a switchover position when $D_4$ range for the 1st through the 4th automatic speed change ranges are selected; "$D_3$" position which is a switchover position when $D_3$ range for the 1st through the 3rd automatic speed change ranges are selected; and "2,1" position which is a switchover position when "2" range for holding the 2nd speed and "1" range for holding the 1st speed are selected, respectively.

In the "$D_5$" position of the manual valve 13, an oil passage L1 which is in communication with the hydraulic oil pressure source 12 is connected to an oil passage L2 which is in communication with the first shift valve $\mathbf{14}_1$. Pressurized oil whose pressure is regulated by a regulator 17 to a certain line pressure is supplied from the oil passage L1 to the oil passage L2. This pressurized oil is constantly supplied to the 1st-speed hydraulic clutch C1 through an oil passage L3 which is branched from the oil passage L2. The pressurized oil is also selectively supplied through the first—fourth shift valves $\mathbf{14}_1$–$\mathbf{14}_4$ to the 2nd-speed hydraulic clutch C2 through the 5th-speed hydraulic clutch C5, whereby an automatic speed changing between the 1st speed–5th speed is provided.

The connections of oil passages among these shift valves $\mathbf{14}_1$–$\mathbf{14}_4$ are as follows. Namely, the first and the second shift valves $\mathbf{14}_1$, $\mathbf{14}_2$ are connected together through two oil passages L4, L5. The first and the third shift valves $\mathbf{14}_1$, $\mathbf{14}_3$ are connected together through two oil passages L6, L7. The second and the third shift valves $\mathbf{14}_2$, $\mathbf{14}_3$ are connected together through five oil passages L8, L9, L10, L11, L12. The second and the fourth shift valves $\mathbf{14}_2$, $\mathbf{14}_4$ are connected together through one oil passage L13. The third and the fourth shift valves $\mathbf{14}_3$, $\mathbf{14}_4$ are connected together through two oil passages L14, L15. An oil passage L16 which is in communication with the 2nd-speed hydraulic clutch C2 is connected to the third shift valve $\mathbf{14}_3$. An oil passage L17 which is in communication with the 3rd-speed hydraulic clutch C3 is connected to the second shift valve $\mathbf{14}_2$. An oil passage L18 which is in communication with the 4th-speed hydraulic clutch C4 is connected to the fourth shift valve $\mathbf{14}_4$. An oil passage L19 which is in communication with the 5th-speed hydraulic clutch C5 is connected to the second shift valve $\mathbf{14}_2$ through an oil passage L20 which is connected to the oil passage L29 at the "$D_5$", "$D_4$" and "$D_3$" positions of the manual valve 13. Further, an oil passage L21 which is in communication with the 1st-speed holding hydraulic clutch CH is connected to the fourth shift valve $\mathbf{14}_4$. To the second shift valve $\mathbf{14}_2$ is connected an oil discharge passage LD which is in communication with an oil discharge control valve 18 which is described in more detail hereinafter. Still furthermore, to the first shift valve $\mathbf{14}_1$ are connected oil passages L$\mathbf{22}_1$, L$\mathbf{22}_2$ which are on the output side of the first and the second pressure regulating valves $\mathbf{15}_1$ $\mathbf{15}_2$.

The input side of each of the first and the second pressure regulating valves $\mathbf{15}_1$, $\mathbf{15}_2$ has connected thereto the oil passage L2. By means of the oil pressure in oil passages L$\mathbf{24}_1$, l$\mathbf{24}_2$ which are on the output side of each of first and second linear solenoid valves $\mathbf{20}_1$, $\mathbf{20}_2$ which are connected to an oil passage L23 on an output side of a modulator valve 19 which reduces the line pressure from the oil passage L1 to a certain oil pressure (hereinafter called a modulator pressure) lower than the line pressure, each of the pressure regulating valves $\mathbf{15}_1$, $\mathbf{15}_2$ is forced to the leftward opening side. Further, each of the pressure regulating valves $\mathbf{15}_1$, $\mathbf{15}_2$ is also forced to the rightward closing side by urging forces of springs $\mathbf{15}_1a$, $\mathbf{15}_2a$ and by the oil pressures in the oil passages L$\mathbf{22}_1$, L$\mathbf{22}_2$ on the output side of each of the pressure regulating valves $\mathbf{15}_1$, $\mathbf{15}_2$. It is thus so arranged that the oil pressure in each of the oil passages L$\mathbf{22}_1$, L$\mathbf{22}_2$ is adjusted to the oil pressure depending on the output pressure of each of the linear solenoid valves $\mathbf{20}_1$, $\mathbf{20}_2$. To the oil passage L23, there is also connected a third linear solenoid valve $\mathbf{20}_3$ which controls the connection force of the lock-up clutch 3*a*, which is built in the fluid torque converter 3, through a hydraulic oil control circuit 11*a* for the lock-up clutch.

The oil passage L23 has connected thereto first—third open-close type of solenoid valves $\mathbf{21}_1$, $\mathbf{21}_2$, $\mathbf{21}_3$. By means of these solenoid valves $\mathbf{21}_1$, $\mathbf{21}_2$, $\mathbf{21}_3$, the first—the third shift valves $\mathbf{14}_1$, $\mathbf{14}_2$, $\mathbf{14}_3$ are controlled for switchover operation. In other words, the first shift valve $\mathbf{14}_1$ is forced to the left by the urging force of a spring $\mathbf{14}_1a$ and by the oil pressure in an oil passage L$\mathbf{25}_1$ on the output side of the first solenoid valve $\mathbf{21}_1$ and is also forced to the right by the modulator pressure from the oil passage L23. When the oil pressure in the oil passage L$\mathbf{25}_1$ has become the modulator pressure as a result of opening of the first solenoid valve $\mathbf{21}_1$, the first shift valve $\mathbf{14}_1$ is switched to the left position and, when the oil passage L$\mathbf{25}_1$ has been opened to the atmosphere as a result of closing of the first solenoid valve $\mathbf{21}_1$, the first shift valve $\mathbf{14}_1$ is switched to the right position. Each of the second and the third shift valves $\mathbf{14}_2$, $\mathbf{14}_3$ is forced to the right by the urging force of a spring $\mathbf{14}_2a$, $\mathbf{14}_3a$ and is also forced to the left by the oil pressure in oil passages L$\mathbf{25}_2$, L$\mathbf{25}_3$ on the output side of each of the second and the third solenoid valves $\mathbf{21}_2$, $\mathbf{21}_3$. Each of the second and third shift valves $\mathbf{14}_2$, $\mathbf{14}_3$ is switched to the left position when the oil pressure in the oil passages L$\mathbf{25}_2$, L$\mathbf{2}_3$ has become the modulator pressure as a result of opening of each of the second and the third solenoid valves $\mathbf{21}_2$, $\mathbf{21}_3$, and is switched to the right position when the oil passages L$\mathbf{25}_2$, L$\mathbf{25}_3$ have been opened to the atmosphere as a result of closing of each of the second and the third solenoid valves $\mathbf{21}_2$, $\mathbf{21}_3$.

The fourth shift valve $14_4$ is forced to the right by an urging force of a spring $14_4a$ and is forced to the left by the oil pressure in an oil passage L26 which is connected to the oil passage L1 in the "$D_5$", "$D_4$" and "$D_3$" positions of the manual valve 13. In this manner, in the "$D_5$", "$D_4$" and "$D_3$" positions of the manual valve 13, the fourth shift valve $14_4$ is always restrained to the left position, and is switched to the right position when the oil passage L26 has been opened to atmosphere as a result of switching of the manual valve 13 to the "2, 1" position. When the fourth shift valve $14_4$ is in the left position, the oil passage L21 for the 1st-speed holding hydraulic clutch CH is connected to an oil discharge port $14_4b$ of the fourth shift valve $14_4$. In this manner, there occurs no connection of the 1st-speed holding hydraulic clutch CH in the "$D_5$", "$D_4$" and "$D_3$" positions.

The oil discharge control valve 18 which is disposed in the oil discharge passage LD is to open and close a side passage LDb which is in parallel with an oil discharge port LDa which is on a downstream end of the oil discharge passage LD and which is provided with an orifice. The oil discharge control valve 18 is forced to the rightward closing side by the urging force of a sprig 18a and is forced to the leftward opening side by the oil pressure in the oil passage L17 for the 3rd-speed hydraulic clutch C3 and by the oil pressure in the oil passage $L22_1$ on the output side of the first pressure regulator valve $15_1$. At the time of downshifting from the 5th-speed transmission train G5 to the 4th-speed transmission train G4, the 3rd-speed transmission train G3 or the 2nd-speed transmission train G2, which are described in more detail hereinafter, the oil discharge control valve 18 opens when the oil pressure in the 4th-speed, the 3rd-speed, or the 2nd-speed hydraulic clutch, which is an on-coming clutch, has reached a predetermined values Thus, it operates to quickly release the 5th-speed hydraulic clutch C5, which is an off-going clutch.

In the hydraulic circuit 11, there are provided the following: namely, accumulators A1, A2, A3, A5 for the 1st, the 2nd, the 3rd and the 5th speeds which are respectively connected to the oil passages L3, L16, L17, L19 for the 1st-speed–5th-speed hydraulic clutches C1, C2, C3, C5; and an accumulator A4H which is used both for the 4th-speed and the 1st-speed holding and which has connected thereto the oil passage L18 for the 4th-speed hydraulic clutch C4 and the oil passage L21 for the first speed holding clutch CH. An accumulator of a large capacity is used as the 1st-speed accumulator A1 to buffer the in-gear shocks. There is further provided a third pressure regulating valve $15_3$ which is controlled by the third linear solenoid valve $20_3$. An oil passage L27 on the output side of the third pressure regulating valve $15_3$ is connected to a back pressure chamber A1a of the 1st-speed accumulator A1. The input side of the third pressure regulating valve $15_3$ has connected thereto the oil passage L1. By the oil pressure in an oil passage $L24_3$ on the output side of the third linear solenoid valve $20_3$, the third pressure regulating valve $15_3$ is forced to the leftward opening side in which the oil passage L1 and the oil passage L27 are connected together. Also, by the urging force of a spring $15_3a$ and the oil pressure in the oil passage L27, the third pressure regulating valve $15_3$ is forced to rightward closing side. In this manner, the oil pressure in the oil passage L27, i.e., the back pressure in the 1st-speed accumulator A1, is increased or decreased depending on the output pressure of the third linear solenoid valve $20_3$.

An accumulator of a large capacity is also used for the 5th-speed accumulator A5 so that it can cope with the skipped downshifting from the 5th-speed transmission train G5 to the 3rd-speed transmission train G3 or to the 2nd-speed transmission train G2. In addition, an oil passage L28 which is in communication with a back pressure chamber A5a of the 5th-speed accumulator A5 can be selectively connected to the oil passage L2 and the oil passage L27 through a changeover valve 22 which is controlled by the second solenoid valve $21_2$. The changeover valve 22 is urged by a spring 22a to the right position in which the oil passage L28 is connected to the oil passage L2 which serves as the oil passage in (or having) the line pressure, and is also forced, by the oil pressure in the oil passage $L25_2$ on the output side of the second solenoid valve $21_2$, to the left position in which the oil passage L28 is connected to the oil passage L27. In this manner, when the second solenoid valve $21_2$ is closed, the changeover valve 22 is switched to the right position, whereby the back pressure in the 5th-speed accumulator A5 becomes the line pressure which is supplied from the oil passage L2. On the other hand, when the second solenoid valve $21_2$ is opened, the changeover valve 22 is switched to the left position, whereby the back pressure in the 5th-speed accumulator A5 becomes a state in which it can be controlled by the third linear solenoid valve $20_3$ which serves as the pressure regulating means.

At the time of 1st-speed running with the manual valve 13 positioned in the "$D_5$" position, the first—the third shift valves $14_1$, $14_2$, $14_3$ are all switched to the right position. According to this arrangement, the oil passage L16 for the 2nd-speed hydraulic clutch C2 is connected to the oil passage $L22_1$ through the third shift valve $14_3$, the oil passage L12, the second shift valve $14_2$, the oil passage L5, and the first shift valve $14_1$. The oil passage L17 for the 3rd-speed hydraulic clutch C3 is connected to an oil discharge port $14_2b$ of the second shift valve $14_2$. The oil passage L18 for the 4th-speed hydraulic clutch C4 is connected to an oil discharge port $14_3b$ of the third shift valve $14_3$ through the fourth shift valve $14_4$ and the oil passage L14. The oil passage L19 for the 5th-speed hydraulic clutch C5 is connected to the oil discharge port $14_3c$ of the third shift valve $14_3$ through the oil passage L20, the second shift valve $14_2$ and the oil passage L10. In this manner, the oil pressure in the 3rd-speed hydraulic clutch C3 (hereinafter called 3rd-speed pressure), the oil pressure in the 4th-speed hydraulic clutch C4 (hereinafter called 4th-speed pressure), and the oil pressure in the 5th-speed hydraulic clutch C5 (hereinafter called 5th-speed pressure) all become the atmospheric pressure. On the other hand, the oil pressure in the 2nd-speed hydraulic clutch C2 (hereinafter called 2nd-speed pressure) becomes capable of being controlled by the first pressure regulating valve $15_1$, i.e., by the first linear solenoid valve $20_2$. Namely, the upshifting to the 2nd-speed is carried out by increasing the 2nd-speed pressure by means of the first linear solenoid valve $20_1$.

When the upshifting to the 2nd speed has been completed, the first shift valve $14_1$ is switched to the left position while holding both the second and the third shift valves $14_2$, $14_3$ to the right position. According to this arrangement, the connection of the oil passage L5 is switched to the oil passage L2, instead of to the oil passage $L22_1$. The 2nd-speed pressure is thus increased to the line pressure and the 2nd-speed hydraulic clutch C2 is completely engaged, whereby the running in the 2nd-speed transmission train G2 is provided.

At the time of initial gear engagement (i.e., so called "in-gear" time) when the manual valve 13 is switched from the "N" position to the "$D_5$" position, the following in-gear control is carried out in order to reduce the in-gear shocks (i.e., shocks at the time of initial gear engagement). Namely, first of all, like at the time of 2nd-speed running, the first shift valve $14_1$ is moved to the left position and both the second and the third shift valves $14_2$, $14_3$ are moved to the right position. The driving torque of the driving wheels 4 is thus gradually increased by the power transmission through the 2nd-speed transmission train G2. Thereafter, while holding both the second and the third shift valves $14_2$, $14_3$ in the right position, the first shift valve $14_1$ is switched to the right position. Here, the oil passage L3 for the 1st-speed hydraulic clutch C1 is constantly communicated with the oil passage L2 through an orifice $23_1$. In the right position of the first shift valve $14_1$, the oil passage L3 is connected to the oil passage L2 through the oil supply bypass passage L3*a* which has interposed therein an orifice $23_2$ and which is in parallel with the orifice $23_1$. On the other hand, in the left position of the first shift valve $14_1$, the oil passage L3 is connected to the oil passage L2 through the oil supply bypass passage L3*b* which has interposed therein a check valve 24 for oil discharging and which is in parallel with the orifice $23_1$. In this manner, when the first shift valve $14_1$ is switched to the left position at the beginning of the in-gear operation, the 1st-speed hydraulic clutch C1 is supplied with oil only through the orifice $23_1$. Then, at the beginning of the in-gear operation, the back pressure of the 1st-speed accumulator A1 is kept low. As a result of the combined effect of restricting the oil supply by means of the orifice $23_1$, the rise in the oil pressure in the 1st-speed hydraulic clutch C1 (hereinafter called the 1st-speed pressure) is delayed or retarded. As a result, the 2nd-speed pressure rises earlier than the 1st-speed pressure, and the power transmission by the 2nd-speed transmission train begins. Thereafter, the first shift valve $14_1$ is switched to the right position to thereby supply the oil to the 1st-speed hydraulic clutch C1 also through the oil supply bypass passage L3*a*. The back pressure of the 1st-speed accumulator A1 is also increased to thereby quickly increase the 1st-speed pressure, and the 2nd-speed pressure is decreased by the first solenoid valve $20_1$. In this manner, the 1st-speed transmission train G1 can be established at a good response while buffering the in-gear shocks. At the time of off-gear operation in which the manual valve 13 is switched from the forward running positions of "$D_5$"–"2,1" to the "N" position, the first shift valve $14_1$ is initially positioned in the right position, whereby the 1st-speed pressure is gradually reduced to buffer the off-gear shocks. Thereafter, the first shift valve $14_1$ is switched to the left position. As a result, by the oil discharging through the oil discharge bypass passage L3*b*, the 1st-speed pressure is rapidly reduced to the atmospheric pressure.

At the time of upshifting from the 2nd speed to the 3rd speed, the first—the third shift valves $14_1$, $14_2$, $14_3$ are switched to the state in which the first and the second shift valves $14_1$, $14_2$ are in the left position and that the third shift valve $14_3$ is in the right position. According to this arrangement, the oil passage L16 for the 2nd-speed hydraulic clutch C2 is connected to the oil passage $L22_1$ through the third shift valve $14_3$, the oil passage L12, the second shift valve $14_2$, the oil passage L4, and the first shift valve $14_1$. The oil passage L17 for the 3rd-speed hydraulic clutch C3 is connected to the oil passage $L22_2$ through the second shift valve $14_2$, the oil passage L9, the third shift valve $14_3$, the oil passage L6, and the first shift valve $14_1$. The oil passage L18 for the 4th-speed hydraulic clutch C4 is connected, in a manner similar to that in the 1st-speed running and the 2nd-speed running, to the oil discharge port $14_3b$ of the third shift valve $14_3$ through the fourth shift valve $14_4$ and the oil passage L14. The oil passage L19 for the 5th-speed hydraulic clutch C5 is connected to the oil discharge passage LD through the oil passage L20 and the second shift valve $14_2$. In this state, the 2nd-speed pressure and the 3rd-speed pressure respectively become capable of being controlled by the first linear solenoid valve $20_1$ and the second linear solenoid valve $20_2$, respectively. By performing the pressure decrease control of the 2nd-speed pressure by means of the first linear solenoid valve $20_1$, and the pressure increase control of the 3rd-speed pressure by means of the second linear solenoid valve $20_2$, the vehicle is up-shifted from the 2nd speed to the 3rd speed.

Once the upshifting to the 3rd speed has been completed, the first—the third shift valves $14_1$, $14_2$, $14_3$ are switched to such a state that the first shift valve $14_1$ is in the right position, that the second shift valve $14_2$ is in the left position, and that the third shift valve $14_3$ is in the right position. According to this arrangement, the oil passage L4 which has been connected to the 2nd-speed hydraulic clutch C2 in a route similar to that at the time of upshifting to the 3rd speed, is connected to an oil discharge port $14_1b$ of the first shift valve $14_1$, whereby the 2nd-speed pressure lowers to the atmospheric pressure. Also, the oil passage L6 which has been connected to the 3rd-speed hydraulic clutch C3 in a route similar to that at the time of upshifting to the 3rd speed, is connected to the oil passage L2 through the first shift valve $14_1$. As a result, the 3rd-speed pressure is increased to the line pressure and the 3rd-speed hydraulic clutch C3 is completely engaged, whereby the running in the 3rd-speed transmission train G3 is provided.

At the time of upshifting from the 3rd speed to the 4th speed, the first—the third shift valves $14_1$, $14_2$, $14_3$ are switched to such a state that the first shift valve $14_1$ is in the right position and that both the second and the third shift valves $14_2$, $14_3$ are in the left position. According to this operation, the oil passage L16 for the 2nd-speed hydraulic clutch C2 is connected to an oil discharge port $14_4c$ of the fourth shift valve $14_4$ through the third shift valve $14_3$ and the oil passage L15. The oil passage L17 for the 3rd-speed hydraulic clutch C3 is connected to the oil passage $L22_2$ through the second shift valve $14_2$, the oil passage L9, the third shift valve $14_3$, the oil passage L7, and the first shift valve $14_1$. The oil passage L18 for the 4th-speed hydraulic clutch C4 is connected to the oil passage $L22_1$ through the fourth shift valve $14_4$, the oil passage L14, the third shift valve $14_3$, the oil passage L11, the second shift valve $14_2$ and the first shift valve $14_1$. The oil passage L19 for the 5th-speed hydraulic clutch C5 is connected, in a manner similar to that at the time of upshifting to the 3rd speed and at the time of running at the 3rd speed, to the oil discharge passage LD through the oil passage L20 and the second shift valve $14_2$. In this state, the 3rd-speed pressure and the 4th-speed pressure respectively become capable of being controlled by the second linear solenoid valve $20_1$ and the first linear solenoid valve $20_1$. By thus performing the pressure decrease control of the 3rd-speed pressure by means of the second linear solenoid valve $20_2$ and the pressure increase control of the 4th-speed pressure by means of the first linear solenoid valve $20_1$, the vehicle is up-shifted from the 3rd speed to the 4th speed.

Once the upshifting to the 4th speed has been completed, the first—the third shift valves $14_1$, $14_2$, $14_3$ are switched to such a state that all of them are in the left position. According to this arrangement, the oil passage L7 which has been connected to the 3rd-speed hydraulic clutch C3 in a route similar to that at the time of upshifting to the 4th speed, is connected to an oil discharge port $14_1c$ of the first shift valve $14_1$, whereby the 3rd-speed pressure lowers to the atmospheric pressure. Also, the oil passage L5 which has been connected to the 4th-speed hydraulic clutch C4 in a route similar to that at the time of upshifting to the 4th speed, is connected to the oil passage L2 through the first shift valve 14$_1$. As a result, the 4th-speed pressure is increased to the line pressure and the 4th-speed hydraulic clutch C4 is thus completely engaged, whereby the running in the 4th-speed transmission train G4 is provided.

At the time of upshifting from the 4th speed to the 5th speed, the first—the third shift valves 14$_1$, 14$_2$, 14$_3$ are switched to such a state that the first shift valve 14$_1$ is in the left position, that the second shift valve 14$_2$ is in the right position and that the third shift valve 14$_1$ is in the left position. According to this arrangement, the oil passage L16 for the 2nd-speed hydraulic clutch C2 is connected to the oil discharge port 14$_4$*c* of the fourth shift valve 14$_4$ through the third shift valve 14$_3$ and the oil passage L15, in a manner similar to that at the time of upshifting to the 4th speed and at the time of running at the 4th speed. The oil passage L17 for the 3rd-speed hydraulic clutch C3 is connected to the oil discharge port 14$_2$*b* of the second shift valve 14$_2$ in a manner similar to that at the time of running at the 1st speed and the 2nd speed. The oil passage L18 for the 4th-speed hydraulic clutch C4 is connected to the oil passage L22$_1$ through the fourth shift valve 14$_4$, the oil passage L14, the third shift valve 14$_3$, the oil passage L11, the second shift valve 14$_2$, the oil passage L4, and the first shift valve 14$_1$. The oil passage L19 for the 5th-speed hydraulic clutch C5 is connected to the oil passage L22$_2$ through the oil passage L20, the second shift valve 14$_2$, the oil passage L10, the third shift valve 14$_3$, the oil passage L6 and the first shift valve 14$_1$. In this state, the 4th-speed pressure and the 5th-speed pressure become capable of being controlled by the first linear solenoid valve 20$_1$ and the second linear solenoid valve 20$_2$, respectively. By performing the pressure decrease control of the 4th-speed pressure by means of the first linear solenoid coil 20$_1$ and the pressure increase control of the 5th-speed pressure by means of the second linear solenoid valve 20$_2$, the vehicle is up-shifted from the 4th speed to the 5th speed. At this time, the changeover valve 22 is switched to the right position, and the back pressure of the 5th-speed accumulator A5 is in the line pressure. The 5th-speed hydraulic clutch C5 is substantially engaged before the pressure increases in the 5th-speed pressure is buffered by the accumulated pressure in the accumulator A5. Therefore, there is no possibility that the increase control of the 5th-speed pressure by means of the second linear solenoid valve 20$_2$ is adversely affected.

Once the upshifting to the 5th-speed has been completed, the first–the third shift valves 14$_1$, 14$_2$, 14$_3$ are switched to such a state that both the first and the second shift valves 14$_1$, 14$_2$ are in the right position and that the third shift valve 14$_3$ is in the left position. According to this operation, the oil passage L4 which has been connected to the 4th-speed hydraulic clutch C4 in a route similar to that at the time of upshifting to the 5th speed, is connected to the oil discharge port 14$_1$*b* of the first shift valve 14$_1$, whereby the 4th-speed pressure lowers to the atmospheric pressure. Also, the oil passage L6 which has been connected to the 5th-speed hydraulic clutch C5 in a route similar to that at the time of upshifting to the 5th speed, is connected to the oil passage L2 through the first shift valve 14$_1$. As a result, the 5th-speed pressure is increased to the line pressure and the 5th-speed hydraulic clutch C5 is completely engaged, whereby the running in the 5th-speed transmission train G5 is provided.

The first—the third linear solenoid valves 20$_1$, 20$_2$, 20$_3$ and the first—the third solenoid valves 21$_1$, 21$_2$, 21$_3$ are controlled by the above-described electronic control unit 10. In the "$D_5$" range, these linear solenoid valves 20$_1$, 20$_2$, 20$_3$ and the solenoid valves 21$_1$, 21$_2$, 21$_3$ are controlled based on a speed change map shown in FIG. 3 which is set with the vehicle speed V and the throttle opening θ as parameters, whereby the automatic speed changing of the 1st speed—the 5th speed is provided. Here, each of the first—the third solenoid valves 21, 21$_2$, 21$_3$ is made up of a normally-open type which opens when the solenoid valve is not energized (or de-energized). FIG. 4 shows the state as to whether the first—the third solenoid valves 21$_1$, 21$_2$, 21$_3$ are energized or not energized, the position of the first the third shift valves 14$_1$, 14$_2$, 14$_3$ as well as the clutch pressure that is controllable by each of the first and the second linear solenoid valves 20$_1$, 20$_2$ at the time of running in each of the 1st-speed–5th-speed transmission trains as well as at the time of speed changing among these respective speed transmission trains.

At the time of downshifting from the 4th speed to the 3rd speed, the first—the third shift valves 14$_1$, 14$_2$, 14$_3$ are switched to the same state as at the time of upshifting from the 3rd speed to the 4th speed, whereby the pressure decrease control of the 4th-speed pressure by the first linear solenoid valve 20$_1$ and the pressure increase control of the 3rd-speed pressure by the second linear solenoid valve 20$_2$ are performed. In addition, also at the time of downshifting from the 3rd speed to the 2nd speed, the first—the third shift valves 14$_1$, 14$_2$, 14$_3$ are switched to the same state as at the time of upshifting from the 2nd speed to the 3rd speed, whereby the pressure decrease control of the 3rd-speed pressure by the second linear solenoid valve 20$_2$ and the pressure increase control of the 2nd-speed pressure by the first linear solenoid valve 20$_1$ are performed.

Figure 5:
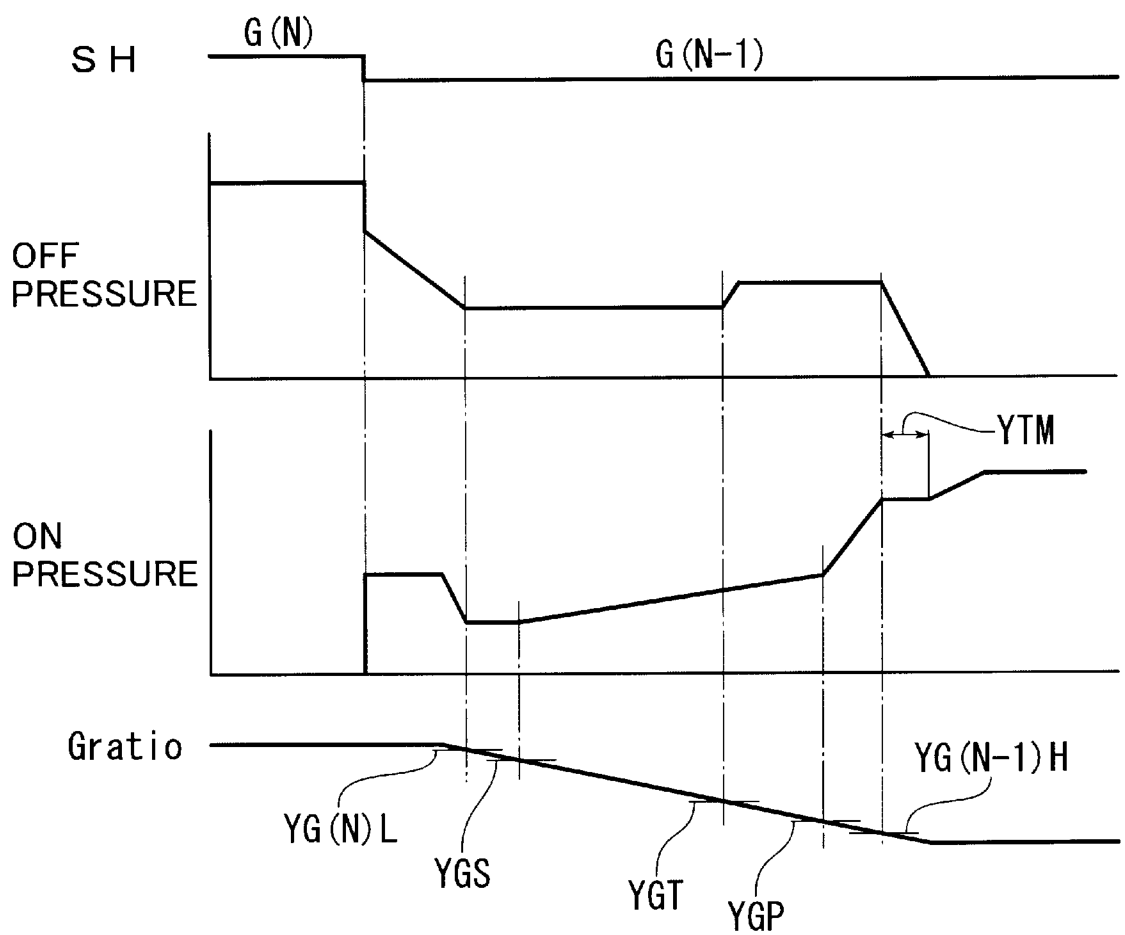
FIG. 5 is a graph showing the changes in the output pressures of the linear solenoid valves at the time of speed changing between speed transmission trains which are adjacent to each other as seen in the order of speed.

FIG. 5 shows: the changes in the output pressure of the linear solenoid valve (the first linear solenoid valve 20$_1$ at the time of downshifting to the 3rd speed, and the second linear solenoid valve 20$_2$ at the time of downshifting to the 2nd speed) which controls the oil pressure in the off-going hydraulic clutch (hereinafter called OFF pressure) at the time of downshifting from the 4th speed to the 3rd speed or at the time of downshifting from the 3rd speed to the 2nd speed; as well as the changes in the output pressure of the linear solenoid valve (the second linear solenoid valve 20$_2$ at the time of downshifting to the 3rd speed, and the first linear solenoid valve 20$_1$ at the time of downshifting to the 2nd speed) which controls the oil pressure in the on-coming hydraulic clutch (hereinafter called ON pressure). When a transmission train to be designated by a transmission train designating signal SH which designates the transmission train to be established based on a speed change map is switched from a speed transmission train G(N) that has been established now to a speed transmission train which is one speed transmission train lower G(N−1), there will, first, be performed the following controls: namely, an OFF pressure control in an initial pressure mode in which the OFF pressure is gradually reduced from an initial value which is set depending on the throttle opening and the vehicle speed; and an ON pressure control in a response pressure mode in which the ON pressure is temporarily increased to thereby fill the hydraulic clutch with oil by an amount equivalent to an ineffective (or non-operative) stroke of the on-coming hydraulic clutch. When an input/output speed ratio "Gratio" (Nout/Nin) of the transmission has become smaller than a lower limit value YG(N)L which is a basis to discriminate whether the hydraulic clutch is engaged or not and which is set based on a gear ratio of the established speed transmission train G(N) before speed changing, there is started the OFF pressure control in the low-pressure holding mode. When the "Gratio" has become smaller than YGS which is set slightly smaller than YG(N)L, there is started the ON pressure control in a gradual increase mode. When the "Gratio" has become smaller than YGT which is set smaller than YGS, there is started the OFF pressure control in a braking mode which slightly increases the OFF pressure. When the "Gratio" has become smaller than YGP which is set smaller than YGT, there is started the ON pressure control in a synchronous mode which increases the ON pressure to a set pressure depending on the vehicle speed and the throttle opening. Then, when the "Gratio" has become smaller than an upper limit value YG(N−1)H which is a basis to discriminate whether the hydraulic clutch has been engaged or not and which is set based on the gear ratio in the speed transmission train G(N−1) that has been established after the speed changing, there is performed the OFF pressure control in an end mode which reduces the OFF pressure to the atmospheric pressure. In addition, after a lapse of a predetermined time YTM from the time when the "Gratio" has become smaller than YG(N−1)H, there is performed the ON pressure control in the end mode which increases the ON pressure to the modulator pressure. Then, when the control of the ON pressure in the end mode has been finished, the first—the third shift valves 14$_1$, 14$_2$, 14$_3$ are switched to the state of running at the 3rd speed or the 2nd speed. The off-going hydraulic clutch is thus released to the atmosphere and also the line pressure is inputted into the on-coming hydraulic clutch.

At the time of downshifting from the 5th speed to the 4th speed, it is also conceivable to perform the following controls. Namely, the first—the third shift valves 14$_1$, 14$_2$, 14$_3$ are switched to the state similar to that at the time of upshifting from the 4th speed to the 5th speed to thereby perform the pressure decrease control of the 5th-speed pressure by the second linear solenoid valve 20$_2$ and the pressure increase control of the 4th-speed pressure by the first linear solenoid valve 20$_1$. However, in this state, the back pressure in the 5th-speed accumulator A5 becomes the line pressure, and the pressure decrease of the 5th-speed pressure is buffered by the 5th-speed accumulator A5 within a high-pressure region. In addition, since the capacity of the 5th-speed accumulator A5 is large, it takes much time for the 5th-speed pressure to decrease to the pressure region in which slipping occurs, resulting in a poor response to the downshifting.

Figure 6A:
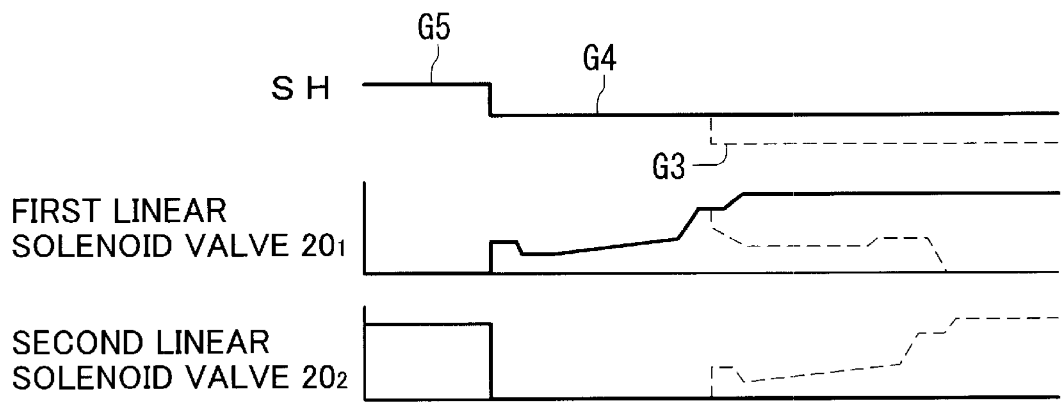
FIG. 6A is a graph showing the change in the output pressure of the linear solenoid valves at the time of 5th–4th speed downshifting.

As a solution, at the time of downshifting from the 5th speed to the 4th speed, the first—the third shift valves 14$_1$, 14$_2$, 14$_3$ are switched to the state identical with that at the time of the speed changing between the 3rd speed and the 4th speed. In this state, the 4th-speed pressure and the 3rd-speed pressure become capable of being controlled by the first linear solenoid valve 20$_1$ and the second linear solenoid valve 20$_2$. In addition, the 5th-speed hydraulic clutch C5 is connected to the oil discharge passage LD and the changeover valve 22 is switched to the left position. As a result, the back pressure in the 5th-speed accumulator A5 becomes capable of being controlled by the third linear solenoid valve 20$_3$. Then, by controlling the back pressure in the 5th-speed accumulator A5 depending on the running or driving conditions, the pressure decrease in the 5th-speed pressure is buffered by the fifth-speed accumulator A5. At the same time, as shown in FIG. 6A, the pressure increase control of the 4th-speed pressure by the first linear solenoid valve 20$_1$ is performed to thereby downshift from the 5th speed to the 4th speed. At this time, the output pressure of the second linear solenoid valve 20$_2$ is kept low to keep the 3rd-speed pressure to the state before increasing. When the designated speed transmission train to be designated by the speed transmission train designating signal SH has been switched to the 3rd-speed transmission train G3 during the downshifting to the 4th speed, there are performed, as shown by dotted lines in FIG. 6A, the pressure decrease control of the 4th-speed pressure by the first linear solenoid valve 20$_1$ and the pressure increase control of the 3rd-speed pressure by the second linear solenoid valve 20$_2$ to thereby downshift by switching (also called switch-downshift) to the 3rd speed.

Figure 3:
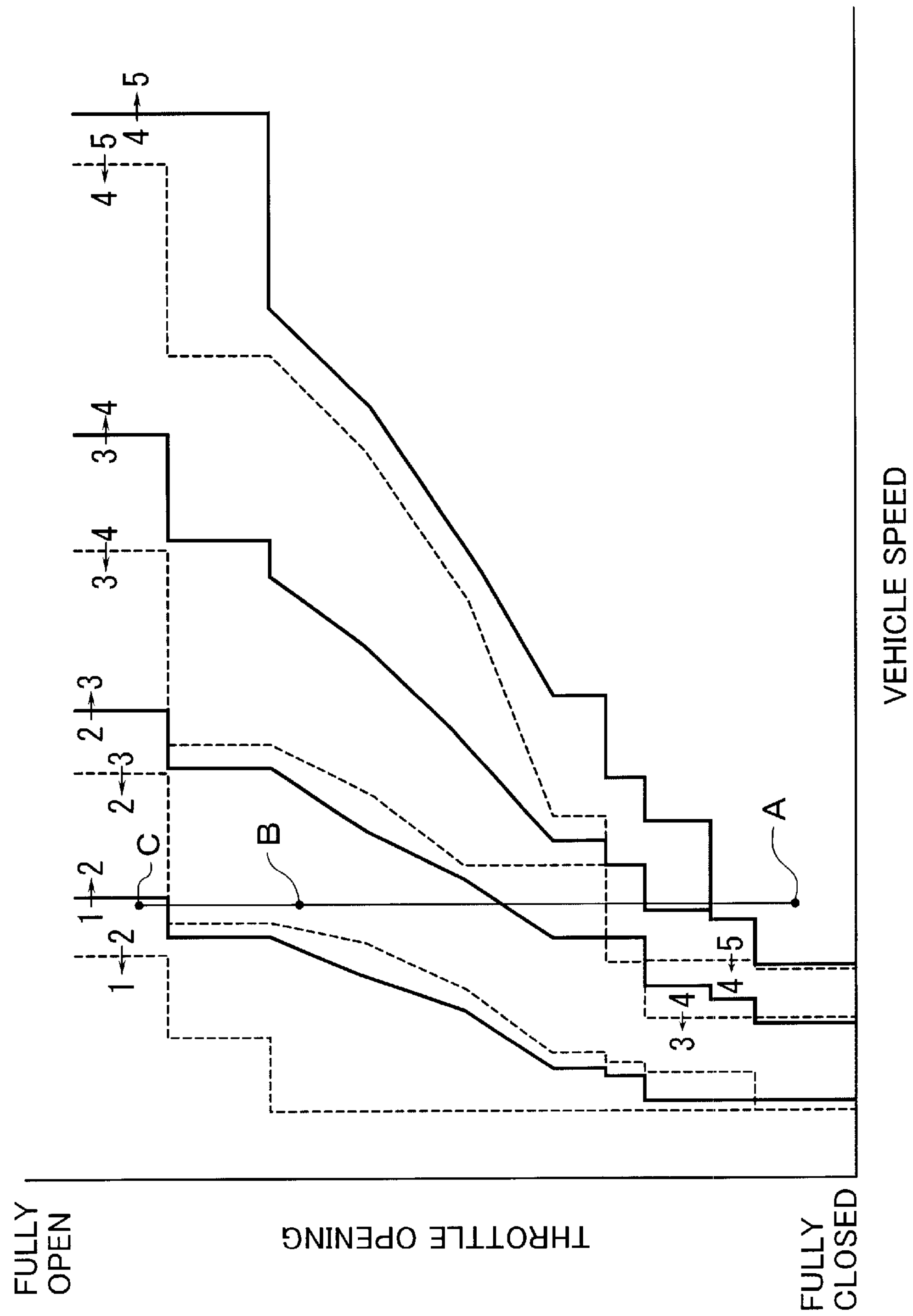
FIG. 3 is a graph showing the speed change characteristics.
Figure 6B:
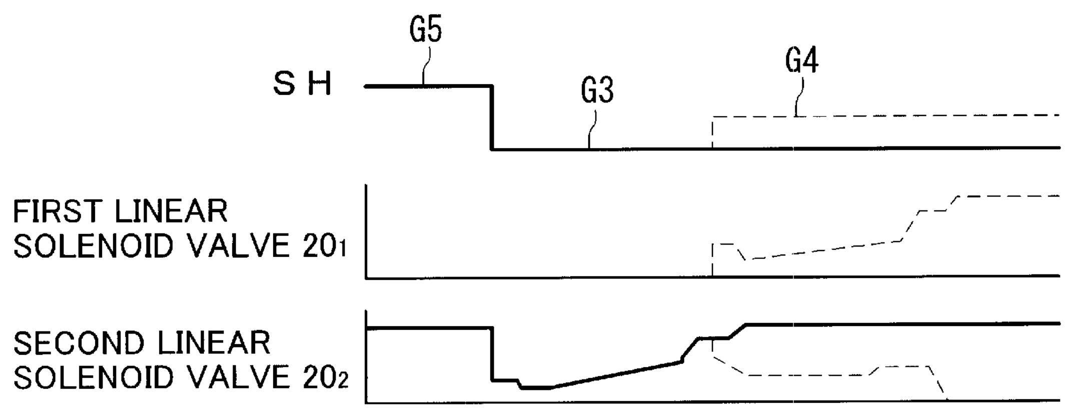
FIG. 6B is a graph showing the change in the output pressure of the linear solenoid valves at the time of 5th–3rd speed downshifting.

When the vehicle speed has moved to the point B or C as a result of depressing of the accelerator while running at the 5th speed at point A in FIG. 3, the speed transmission train to be designated by the speed transmission train designating signal SH is switched from the 5th-speed transmission train G5 to the 3rd-speed transmission train G3 or to the 2nd-speed transmission train G2. When the designated speed transmission train has been switched from the 5th-speed transmission train G5 to the 3rd-speed transmission train G3, the first—the third shift valves 14$_1$, 14$_2$, 14$_3$ are switched to the state identical with that at the time of speed changing between the 3rd speed and the 4th speed. The back pressure control of the 5th-speed accumulator A5 is thereby performed by the third linear solenoid valve 20$_3$. Also, as shown in FIG. 6B, the pressure increase control of the 3rd-speed pressure by the second linear solenoid valve 20$_2$ is performed to thereby downshift by skipping from the 5th speed to the 3rd speed. At this time, the output pressure of the first linear solenoid valve 20$_1$ is kept low to thereby keep the 4th-speed pressure to the state before the pressure increase. When the designated speed transmission train has been switched to the 4th-speed transmission train G4 during downshifting to the 3rd speed, there are performed, as shown by dotted lines in FIG. 6B, the pressure decrease control of the 3rd-speed pressure by the second linear solenoid valve 20$_2$ and the pressure increase control of the 4th-speed pressure by the first linear solenoid valve 20$_1$ to thereby switch-downshift to the 4th speed.

Figure 6C:
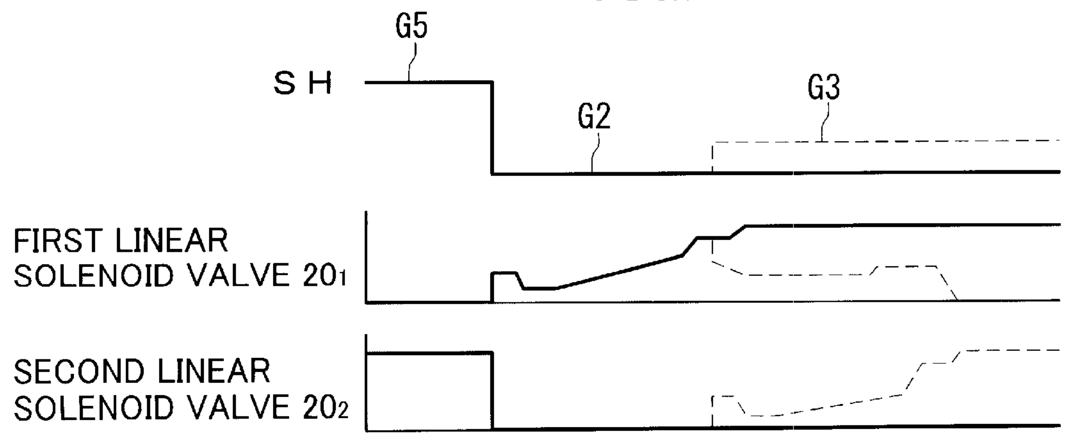
FIG. 6C is a graph showing the change in the output pressure of the linear solenoid valves at the time of 5th–2nd speed downshifting.

When the designated speed transmission train has been switched from the 5th-speed transmission train G5 to the 2nd-speed transmission train G2, the first—the third shift valves 14$_1$, 14$_2$, 14$_3$ are switched to the state identical with that at the time of speed changing between the 2nd speed and the 3rd speed. In this state, the 2nd-speed pressure and the 3rd-speed pressure become capable of being controlled by the first linear solenoid valve 20$_1$ and the second linear solenoid valve 20$_2$, respectively. In addition, like in the state of the speed changing from the 3rd speed to the 4th speed, the 5th-speed hydraulic clutch C5 is connected to the oil discharge passage LD and, also, the back pressure of the 5th-speed accumulator A5 becomes capable of being controlled by the third linear solenoid valve 20$_3$. Then, the back pressure of the 5th-speed accumulator A5 is controlled depending on the running conditions to thereby buffer, by the 5th-speed accumulator A5, the pressure decrease of the 5th-speed pressure. At the same time, as shown in FIG. 6C, the pressure increase control of the 2nd-speed pressure by the first linear solenoid valve 20$_1$ is performed to thereby downshift by skipping from the 5th speed to the 2nd speed. At this time, the output pressure in the second linear solenoid valve 20$_2$ is kept low to keep the 3rd-speed pressure to the state before the pressure increase. When the designated speed transmission train has been switched to the 3rd-speed transmission train G3 during the downshifting to the 2nd speed, there are performed, as shown by dotted lines in FIG. 6C, the pressure decrease control of the 2nd-speed pressure by the first linear solenoid valve 20$_1$ and the pressure increase control of the 3rd-speed pressure by the second linear solenoid valve 20$_2$ to thereby upshift by switching (also called switch-upshift) to the 3rd speed.

As described hereinabove, it becomes possible to perform the skipped downshifting from the 5th speed to the 3rd speed or to the 2nd speed by enlarging the capacity of the 5th-speed accumulator A5. However, unless sufficient amount of pressurized oil is filled in the 5th-speed accumulator A5, the 5th-speed pressure will drop rapidly in the course of the downshifting, resulting in an excessive engine racing and a consequent speed change shock.

As a solution, in the present embodiment, in case sufficient pressurized oil is not accumulated in the 5th-speed accumulator A5, the downshifting control from the 5th speed is performed according to the program shown in FIG. 7 so that the following downshifting can be prohibited, i.e., downshifting from the 5th speed to the 4th speed or skipped downshifting from the 5th speed to the 3rd speed or to the 2nd speed while the first—the third shift valves $\mathbf{14}_1$, $\mathbf{14}_2$, $\mathbf{14}_3$ are kept to the state of speed changing from the 3rd speed to the 4th speed. In more detail, at step S1, a discrimination is made as to whether the downshifting is from the 5th speed or not. If a discrimination is made that the downshifting is from the 5th speed, a discrimination is made at step S2 as to which of the 4th speed, the 3rd speed and the 2nd speed is the target speed of the downshifting. When it is the downshifting from the 5th speed to the 4th speed, the program proceeds from step S2 to step S3, where a discrimination is made as to whether an accumulated pressure discrimination flag FA of the 5th-speed accumulator A5 has been set to "1" or not.

Figure 8:
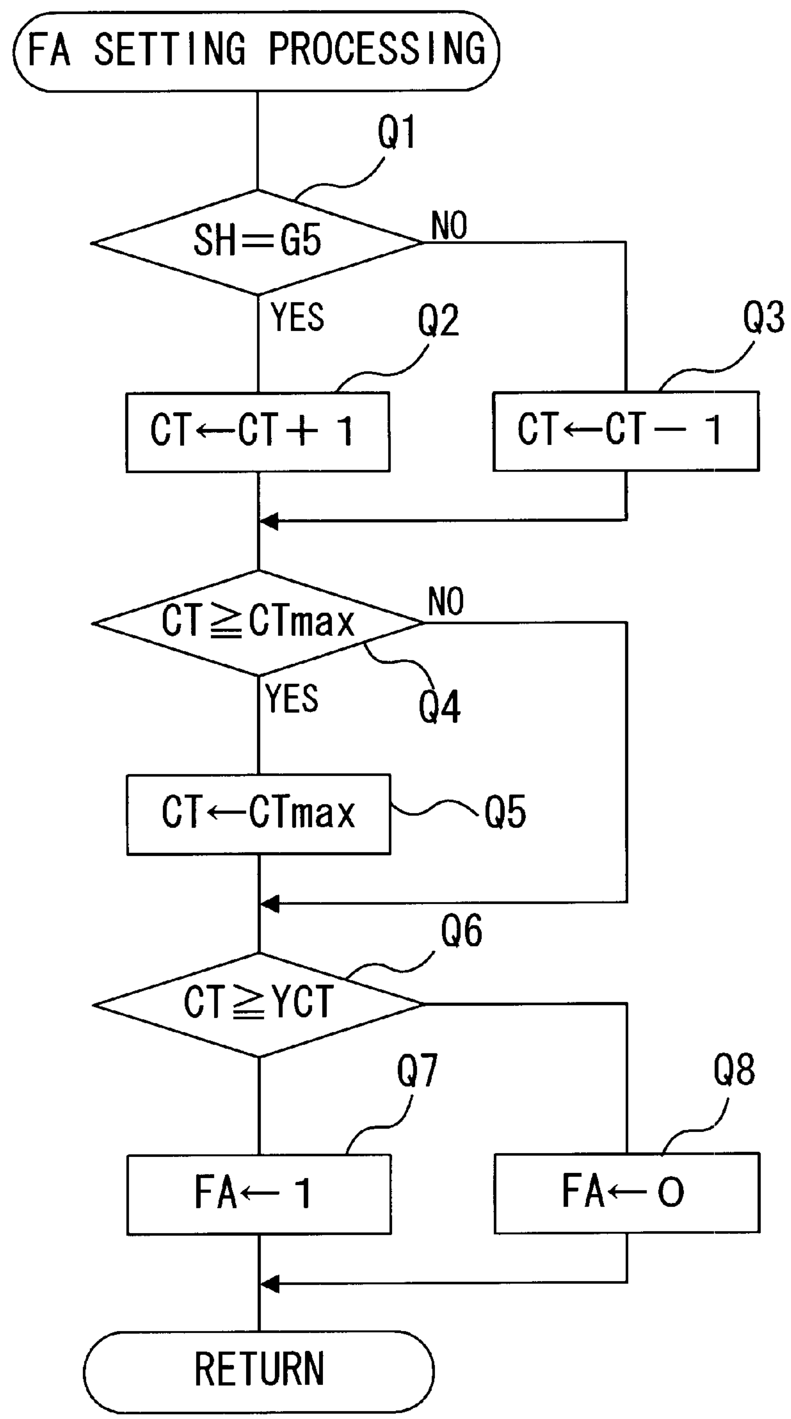
FIG. 8 is a flow chart showing the processing of setting a flag FA for discriminating the pressure accumulation.

The setting processing of the accumulated pressure discrimination flag FA is shown in FIG. 8. First, at step Q1, a discrimination is made as to whether the speed transmission train designation signal SH has designated the 5th-speed transmission train G5 or not. If SH=G5, 1 is added to an accumulated pressure counter value CT at step Q2. If SH≠G5, 1 is deducted from CT at step Q3. Then, at step Q4, a discrimination is made as to whether CT has exceeded an upper limit value CTmax which corresponds to the state of fully accumulated pressure in the 5th-speed accumulator A5. If CT>CTmax, CT is written over to CTmax at step Q5. Then, at step Q6, a discrimination is made as to whether CT has exceeded a predetermined set value of YCT. If CT>YCT, FA is set to 1 at step Q7. If CT<YCT, FA is reset to 0 at step Q8. YCT is set depending on the time required from the start of filling the 5th-speed hydraulic clutch C5 with oil to the time when the 5th-speed accumulator A5 is filled with oil above a predetermined quantity. In this manner, if FA=1, the accumulated oil amount in the 5th-speed accumulator A5 will exceed the predetermined value.

If a discrimination of FA=1 is made at the above step S3, the program proceeds to step S4, where the first—the third shift valves $\mathbf{14}_1$, $\mathbf{14}_2$, $\mathbf{14}_3$ are switched to the state of speed changing between the 3rd speed and the 4th speed. As shown in FIG. 6A, while the second linear solenoid valve $\mathbf{20}_2$ is kept waiting at a low pressure, the pressure increase control of the 4th-speed pressure is performed by the first linear solenoid valve $\mathbf{20}_1$, to thereby downshift from the 5th speed to the 4th speed. On the other hand, when a discrimination of FA≠1 is made at step S3, i.e., when the accumulated oil amount in the 5th-speed accumulator A5 is below a predetermined value, the first—the third shift valves $\mathbf{14}_1$, $\mathbf{14}_2$, $\mathbf{14}_3$ are switched at step S5 to the state of speed changing between the 4th speed and the 5th speed. Also, the pressure decrease control of the 5th-speed pressure by the second linear solenoid valve $\mathbf{20}_2$ and the pressure increase control of the 4th-speed pressure by the first linear solenoid valve $\mathbf{20}_1$ are performed to thereby downshift from the 5th speed to the 4th speed.

At the time of downshifting from the 5th speed to the 3rd speed, the program proceeds from step S2 to step S6 to discriminate as to whether FA=1 or not. If FA=1, the first—the third shift valves $\mathbf{14}_1$, $\mathbf{14}_2$, $\mathbf{14}_3$ are switched at step S7 to the state of speed changing between the 3rd speed and the 4th speed. As shown in FIG. 6B, the pressure increase control of the 3rd-speed pressure is performed by the second linear solenoid valve $\mathbf{20}_2$ while keeping the first linear solenoid valve $\mathbf{20}_1$ to the low pressure waiting state to thereby downshift from the 5th speed to the 3rd speed. On the other hand, when a discrimination of FA≠1 is made at step S6, downshifting from the 5th speed to the 4th speed is performed at step S8 by a similar control as in the control at step S5. Then, at step S9, the first—the third shift valves $\mathbf{14}_1$, $\mathbf{14}_2$, $\mathbf{14}_3$ are switched to the state of speed changing between the 3rd speed and the 4th speed. The pressure decrease control of the 4th-speed pressure by the first linear solenoid valve $\mathbf{20}_1$ and the pressure increase control of the 3rd-speed pressure by the second linear solenoid valve $\mathbf{20}_2$ are performed to thereby downshift from the 4th speed to the 3rd speed.

At the time of downshifting from the 5th speed to the 2nd speed, the program proceeds from step S2 to step S10 to discriminate whether FA=1 or not. If FA=1, at step 11, the first—the third shift valves $\mathbf{14}_1$, $\mathbf{14}_2$, $\mathbf{14}_3$ are switched to the state of speed changing between the 2nd speed and the 3rd speed. As shown in FIG. 6C, the pressure increase control of the 2nd-speed pressure is performed by the first linear solenoid valve $\mathbf{20}_1$ while keeping the second linear solenoid valve $\mathbf{20}_2$ to the low pressure waiting state to thereby downshift from the 5th speed to the 2nd speed. On the other hand, if a discrimination of FA≠1 is made at step S10, downshifting is sequentially performed at steps S12, S13 from the 5th speed to the 4th speed and from the 4th speed to the 3rd speed by a control similar to that as at steps S8, S9. Then, at step S14, the first—the third shift valves $\mathbf{14}_1$, $\mathbf{14}_2$, $\mathbf{14}_3$ are switched to the state of speed changing between the 2nd speed and the 3rd speed. The pressure decrease control of the 3rd-speed pressure by the second solenoid valve $\mathbf{20}_2$ and the pressure increase control of the 2nd-speed pressure by the first linear solenoid valve $\mathbf{20}_1$ are performed to thereby downshift from the 3rd speed to the 2nd speed.

Explanations have so far been made about the oil passage constitution and the speed change control in the "$D_5$" position of the manual valve 13. The constitution of the oil passages are the same in the "$D_4$" and "$D_3$" positions as in the "$D_5$" position. Then, in the "$D_4$" position, the automatic speed changing for the 1st speed the 3rd speed is performed based on the speed change map for the "$D_4$" range and in the "$D_3$" position, the automatic speed changing for the 1st speed–3rd speed is performed based on the speed change map for the $D_3$ range.

In "2, 1" position of the manual valve 13, the oil passage L19 for the 5th-speed hydraulic clutch C5 is opened to the atmosphere and, as described hereinabove, the fourth shift valve $\mathbf{14}_4$ is switched to the right position. As a result, the oil passage L18 for the 4th-speed hydraulic clutch C4 is connected to an oil discharge port $\mathbf{14}_4b$ of the fourth shift valve $\mathbf{14}_4$. In this manner, the 5th-speed hydraulic clutch C5 and the 4th-speed hydraulic clutch C4 become incapable of being engaged. In addition, the oil passage L21 for the 1st-speed holding hydraulic clutch CH is connected to the oil passage L13 through the fourth shift valve $\mathbf{14}_4$. When the first—the third shift valves $\mathbf{14}_1$, $\mathbf{14}_2$, $\mathbf{14}_3$ are switched to the state of the 1st speed, the oil passage L13 is connected to the oil passage $\mathbf{L22}_2$ through the second shift valve $\mathbf{14}_2$, the oil passage L8, the third shift valve $\mathbf{14}_3$, the oil passage L7 and the first shift valve $\mathbf{14}_1$. In this manner, the hydraulic pressure in the 1st-speed holding hydraulic clutch CH becomes capable of being controlled by the second linear solenoid valve $\mathbf{20}_2$. When the first—the third shift valves $\mathbf{14}_1$, $\mathbf{14}_2$, $\mathbf{14}_3$ are switched to the state of the 2nd speed, the oil passage L7 is connected to the oil discharge port $\mathbf{14}_1c$ of the first shift valve $\mathbf{14}_1$. When they are switched to the state of the 2nd—the 3rd speed changing and to the state of the 3rd speed, the oil passage L13 is connected to the oil discharge port $\mathbf{14}_2b$ of the second shift valve $\mathbf{14}_2$. In any of the above cases, the oil is not supplied to the 1st-speed holding hydraulic clutch CH. Then, when the "2" range or the "1" range is selected by the selector lever 9, if the vehicle is running at a high speed, the 3rd-speed transmission train G3 is established first. When the vehicle speed has been reduced below a predetermined speed, the vehicle speed is downshifted to the 2nd speed. When the "2" range is selected, the vehicle speed is kept to the 2nd speed. When the "1" range is selected, the vehicle speed is further downshifted to the 1st speed. At this time, by the pressure increase control by the second linear solenoid valve $\mathbf{20}_2$, the 1st-speed holding hydraulic clutch CH is engaged. As a result, the 1st-speed transmission train G1 is established in a state in which the engine brake can be operated.

In the "R" position of the manual valve 13, the oil passage L2 and the oil passage L20 are opened to the atmosphere, and an oil passage L29 for the reverse running is connected to the oil passage L1. Then, a first oil chamber 16*a* on the left end of the servo valve 16 is supplied with oil through an oil passage L30 which is connected to the oil passage L29 through a servo control valve 25. According to this arrangement, the servo valve 16 is pushed to the rightward reverse running position. As a result, the selector gear 6 is switched to the reverse running side, and the oil passage L30 is connected to an oil passage L31 through that axial hole 16*b* in the servo valve 16 which is in communication with the first oil chamber 16*a*. The oil passage L31 is connected to the oil passage L19 for the 5th-speed hydraulic clutch C5 in the "R" position of the manual valve 13. In this manner, the oil is supplied to the 5th-speed hydraulic clutch C5 in a state in which the selector gear 6 is switched to the reverse running side, whereby the reverse running train GR is established. The servo valve 16 has formed therein a second oil chamber 16*c* for forcing the servo valve 16 to the forward running position on the left side. The oil passage L2 is connected to the second oil chamber 16*c* and, in the forward running ranges of "$D_5$"–"2,1" positions, the servo valve 16 is pushed to the forward running position on the left side, whereby the selector gear 6 is switched to the forward running side.

The servo control valve 25 is forced to the leftward open side in which the oil passage L29 and the oil passage L30 are connected, by the oil pressure in the oil passage $\mathrm{L}\mathbf{25}_1$ on the output side of the first solenoid valve $\mathbf{21}_1$ and by the oil pressure in the oil passage $\mathrm{L}\mathbf{25}_2$ on the output side of the second linear solenoid valve $\mathbf{20}_2$. The servo control valve 25 is also forced to the rightward closing side by the urging force of the spring 25*a*, by the oil pressure in the oil passage L3, and by the oil pressure in the oil passage L30. In the forward running range, the servo control valve 25 is restrained to the right end position by the line pressure in the oil passage L3. When the manual valve 13 is switched to the "R" position while the vehicle is running forward at a predetermined speed or above, the output pressure of the first solenoid valve $\mathbf{21}_1$ and the output pressure of the second linear solenoid valve $\mathbf{20}_2$ are both made low. The servo control valve 25 is thus held to the right end position by the urging force of the spring 25*a*. The connection between the oil passage L29 and the oil passage L30 is thereby shut off to prevent the reverse running train GR from being established.

The servo control valve 25 also serves the function as a pressure regulating valve in the "R" position to regulate the 5th speed. At the time of gearing in for the reverse running by switching to the "R" position, the pressure increase in the 5th-speed pressure is controlled by the second linear solenoid valve $\mathbf{20}_1$ through the servo control valve 25 to thereby buffer the in-gear shock. Thereafter, the first solenoid valve $\mathbf{21}_1$ is opened and the servo control valve 25 is pushed up to the left end position by the modulator pressure from the first solenoid valve $\mathbf{21}_1$, whereby the 5th-speed pressure is maintained at the line pressure.

In the "N" position of the manual valve 13, the oil passage L2, the oil passage L29 and the oil passage L31 are opened to the atmosphere, and all of the hydraulic clutches C1–C5, CH are released or disengaged. Further, in the "P" position, the oil passage L29 is connected to the oil passage L1 and the line pressure is inputted into the first oil chamber 16*a* through the servo control valve 25 and the oil passage L30 as a result of opening of the first solenoid valve $\mathbf{21}_1$, whereby the servo valve 16 is switched to the reverse running position. In the "P" position, on the other hand, the connection between the oil passage L19 and the oil passage L31 is shut off and the oil passage L19 is opened to the atmosphere. Therefore, the reverse transmission train GR is not established.

In the above-described embodiment, the capacity of the 5th-speed accumulator A5 is made large to enable the skipped downshifting from the 5th speed to the 3rd speed or to the 2nd speed. It is, of course, possible to upshift by skipping to the 4th speed or to the 5th speed by making the 2nd-speed accumulator A2 large in capacity.

As can be seen from the above explanations, according to the present invention, the skipped speed shifting can be smoothly performed at a good response. The drivability can therefore be improved.

It is readily apparent that the above-described control apparatus for a hydraulically-operated vehicular transmission meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A control apparatus for a hydraulically-operated vehicular transmission having a plurality of hydraulic engaging elements for selectively establishing a plurality of speed transmission trains, said apparatus comprising:

a pair of linear solenoid valves;

switching means for switching oil passage connections into a state in which an oil pressure in a hydraulic engaging element for an arbitrary speed transmission train and an oil pressure in a hydraulic engaging element for a speed transmission train which is adjacent, as seen in an order of speed, to said arbitrary speed transmission train are controllable by said pair of linear solenoid valves;

first control means for speed changing which controls said switching means at a time of speed changing such that an oil pressure in an off-going hydraulic engaging element for a speed transmission train so far established and an oil pressure in an on-coming hydraulic engaging element for a speed transmission train to be established next which is adjacent, as seen in the order of speed, to the speed transmission train so far established, become controllable by said pair of linear solenoid valves, said first control means also controlling said pair of linear solenoid valves such that the oil pressure in said off-going hydraulic engaging element is lowered by one of said pair of linear solenoid valves, said one linear solenoid valve handling said off-going hydraulic engaging element, and that the oil pressure in said on-coming hydraulic engaging element is increased by the other of said pair of linear solenoid valves, said other linear solenoid valve handling the on-coming hydraulic engaging element;

an accumulator connected to an oil passage which is in communication with a predetermined first speed transmission train; and second control means for speed changing which controls said switching means, at a time of speed changing from the first speed transmission train to a second speed transmission train which is not adjacent to the first speed transmission train as seen in the order of speed, such a) that the oil passage which is in communication with a hydraulic engaging element for the first speed transmission train is connected to an oil discharge passage, and b) that an oil pressure in a hydraulic engaging element for the second speed transmission train and an oil pressure in a hydraulic engaging element for a third speed transmission train which is adjacent to the second speed transmission train on a side near the first speed transmission train, as seen in the order of speed, are controllable by said pair of linear solenoid valves, said second control means also controlling said pair of linear solenoid valves such c) that the oil pressure in said hydraulic engaging element for the second speed transmission training increased by one of said pair of liner solenoid valves, paid one linear solenoid valve handling said hydraulic engaging element for the second speed transmission train, and d) that the oil pressure in said hydraulic engaging element for the third speed transmission train is kept to a low pressure waiting state by the other of said pair of liner solenoid valves, said other linear solenoid valve handling said hydraulic engaging element for the third speed transmission train, said second control means controlling said pair of linear solenoid valves when the speed change command to the third speed transmission train is issued in the course of speed changing from the first speed transmission train to the second speed transmission train, such e) that the oil pressure in said hydraulic engaging element for the second speed transmission train is decreased by one of said pair of linear solenoid valves, said one linear solenoid valve handling said hydraulic engaging element for the second speed transmission train, and f) that the oil pressure in said hydraulic engaging element for the third speed transmission train is increased by the other of said pair of linear solenoid valves, said other linear solenoid valve handling said hydraulic engaging element for the third speed transmission train.

2. A control apparatus according to claim 1, further comprising third control means for speed changing which controls said switching means, at a time of speed changing from the first speed transmission train to a fourth speed transmission train which is adjacent to the first speed transmission train, as seen in the order of speed, such e) that the oil passage which is in communication with said hydraulic engaging element for the first speed transmission train is connected to the oil discharge passage, f) that an oil pressure in a hydraulic engaging element for the fourth speed transmission train and an oil pressure in a hydraulic engaging element for a fifth speed transmission train which is adjacent to the fourth speed transmission train on a side away from the first speed transmission train, as seen in the order of speed, are controllable by said pair of linear solenoid valves, said third control means also controlling said pair of liner solenoid valves such g) that the oil pressure in said hydraulic engaging element for the fourth speed transmission train is increased by one of said pair of linear solenoid valves, said one linear solenoid valve handling said hydraulic engaging element for the fourth speed transmission train, and h) that the oil pressure in said hydraulic engaging element for the fifth speed transmission train is kept to a state before the pressure increasing by the other of said pair of liner solenoid valves, said the other linear solenoid valve handling said hydraulic engaging element for the fifth speed transmission train.

3. A control apparatus according to claim 2, further comprising:

detecting means for detecting an amount of accumulated oil in said accumulator; and prohibiting means for prohibiting the control by said second control means and the control by said third control means when the amount of accumulated oil as detected by said detecting means is discriminated to be below a predetermined value.

4. A control apparatus according to claim 3, further comprising:

pressure regulating means for controlling the oil pressure to be inputted into a back pressure chamber of said accumulator; and a changeover valve which, when said switching means is controlled to the state in which the oil pressure in said hydraulic engaging element for the first speed transmission train is controllable by said one linear solenoid valve, disconnects a connection between said back pressure chamber of said accumulator and said pressure regulating means to thereby connect said back pressure chamber to a line-pressure oil passage which is in communication with a pressure source.

5. A control apparatus according to claim 2, further comprising:

pressure regulating means for controlling the oil pressure to be inputted into a back pressure chamber of said accumulator; and a changeover valve which, when said switching means is controlled to the state in which the oil pressure in said hydraulic engaging element for the first speed transmission train is controllable by said one linear solenoid valve, disconnects a connection between said back pressure chamber of said accumulator and said pressure regulating means to thereby connect said back pressure chamber to a line-pressure oil passage which is in communication with a pressure source.

6. A control apparatus according to claim 1, further comprising:

detecting means for detecting an amount of accumulated oil in said accumulator; and prohibiting means for prohibiting the control by said second control means when the amount of accumulated oil as detected by said detecting means is discriminated to be below a predetermined value.

7. A control apparatus according to claim 6, further comprising:

pressure regulating means for controlling the oil pressure to be inputted into a back pressure chamber of said accumulator; and a changeover valve which, when said switching means is controlled to the state in which the oil pressure in said hydraulic engaging element for the first speed transmission train is controllable by said one linear solenoid valve, disconnects a connection between said back pressure chamber of said accumulator and said pressure regulating means to thereby connect said back pressure chamber to a line-pressure oil passage which is in communication with a pressure source.

8. A control apparatus according to claim 1, further comprising:

pressure regulating means for controlling the oil pressure to be inputted into a back pressure chamber of said accumulator; and a changeover valve which, when said switching means is controlled to the state in which the oil pressure in said hydraulic engaging element for the first speed transmission train is controllable by said one linear solenoid valve, disconnects a connection between said back pressure chamber of said accumulator and said pressure regulating means to thereby connect said back pressure chamber to a line-pressure oil passage which is in communication with a pressure source.

* * * * *

UNITED STATES PATENT AND TRADEMARK OFFICE

CERTIFICATE OF CORRECTION

PATENT NO. : 6,397,695 B1
DATED : June 4, 2002
INVENTOR(S) : Okada et al.

It is certified that error appears in the above-identified patent and that said Letters Patent is hereby corrected as shown below:

Column 21,
Line 42, "training increased" should be -- train is increased --
Line 44, "paid" should be -- said --

Signed and Sealed this

Twenty-first Day of January, 2003

JAMES E. ROGAN
*Director of the United States Patent and Trademark Office*